(12) United States Patent
Walker

(10) Patent No.: US 12,214,973 B2
(45) Date of Patent: Feb. 4, 2025

(54) MODULAR MANUFACTURING SYSTEM AND METHOD FOR USE THEREOF

(71) Applicant: Brian A. Walker, New Philadelphia, OH (US)

(72) Inventor: Brian A. Walker, New Philadelphia, OH (US)

(*) Notice: Subject to any disclaimer, the term of this patent is extended or adjusted under 35 U.S.C. 154(b) by 91 days.

(21) Appl. No.: 18/089,900

(22) Filed: Dec. 28, 2022

(65) Prior Publication Data
US 2024/0217757 A1 Jul. 4, 2024

(51) Int. Cl.
| | |
|---|---|
| B65G 47/52 | (2006.01) |
| B65G 39/18 | (2006.01) |
| D06P 1/44 | (2006.01) |
| D06P 5/20 | (2006.01) |
| D06P 5/24 | (2006.01) |

(52) U.S. Cl.
CPC ............ *B65G 47/52* (2013.01); *B65G 39/18* (2013.01); *D06P 1/445* (2013.01); *D06P 5/003* (2013.01); *D06P 5/2066* (2013.01); *B65G 2201/0229* (2013.01)

(58) Field of Classification Search
CPC ............... B65G 47/52; B65G 39/18; B65G 2201/0229; D06P 1/445; D06P 5/003; D06P 5/2066
See application file for complete search history.

(56) References Cited

U.S. PATENT DOCUMENTS

| | | |
|---|---|---|
| 6,349,237 B1 | 2/2002 | Koren et al. |
| 7,241,044 B1 | 7/2007 | Kitamura et al. |
| 2004/0150158 A1 * | 8/2004 | Biegelsen ............ B65H 5/062 271/303 |

(Continued)

FOREIGN PATENT DOCUMENTS

| | | | |
|---|---|---|---|
| EP | 2130680 A1 * | 12/2009 | .......... B41J 11/0015 |
| WO | WO-2005107391 A2 * | 11/2005 | ............. B07C 3/008 |

(Continued)

OTHER PUBLICATIONS

Flexible Manufacturing System, Shivam Shukla et al., International Research Journal of Engineering and Technology (IRJET), vol. 08, Issue 09, Sep. 2021.
Implementation of a Flexible Manufacturing System in a Production Cell of the Automotive Industry: Decision and Choice, Miguel Afonso Sellitto et al., Associação Brasileira de Engenharia de Produção, vol. 29, e20180092, Oct. 10, 2018.

(Continued)

*Primary Examiner* — Gene O Crawford
*Assistant Examiner* — Abby A Jorgensen

(57) ABSTRACT

The system and method use one or more manufacturing base modules can each have a first side, a second side opposite from the first side, a third side to the left of the first side, a fourth side to the right of the first side, a directional movement portion, and at least one operational attachment attached relative to at least two of the at least three base modules. For a given base module, the directional movement portion can define a working area for performing at least one operation on one or more articles passing through the working area, and the operational attachment can perform the at least one operation on the one or more articles. The one or more base modules can be arranged in various different arrangements and layouts with respect to one another to create an assembly line to create finished or semi-finished products from the one or more articles.

24 Claims, 10 Drawing Sheets

(56) References Cited

U.S. PATENT DOCUMENTS

| | | | |
|---|---|---|---|
| 2005/0158094 A1* | 7/2005 | Mandel | G03G 15/65 399/391 |
| 2006/0012102 A1* | 1/2006 | Bobrow | B65H 29/60 271/8.1 |
| 2007/0120305 A1* | 5/2007 | Mandel | G03G 15/6552 399/382 |
| 2008/0230985 A1* | 9/2008 | Bobrow | B65H 29/60 271/225 |
| 2009/0012642 A1* | 1/2009 | Mertens | B23Q 7/1405 700/112 |
| 2011/0156335 A1* | 6/2011 | Kagoshima | B65H 29/58 271/302 |
| 2017/0361411 A1* | 12/2017 | Bielesch | B65H 5/26 |
| 2018/0105979 A1* | 4/2018 | Matsumoto | D06P 5/001 |
| 2023/0115863 A1* | 4/2023 | Molina | B65G 43/10 414/788 |

FOREIGN PATENT DOCUMENTS

| | | | | |
|---|---|---|---|---|
| WO | WO-2022244666 A1 | * | 11/2022 | B41J 15/04 |
| WO | WO-2023006886 A1 | * | 2/2023 | B65G 13/06 |

OTHER PUBLICATIONS

Increasing Productivity With Robots in Flexible Manufacturing Systems, P.G. Ranky, The Industrial Robot, vol. 8, No. 4, Apr. 1, 1981.

International Search Report and Written Opinion dated Mar. 13, 2024 from International Application No. PCT/US2023/085143.

International Preliminary Report on Patentability (Chapter II) with Pending Claim Set dated Nov. 13, 2024 from International Application No. PCT/US2023/085143.

* cited by examiner

MODULAR MANUFACTURING SYSTEM AND METHOD FOR USE THEREOF

FIELD

The present technology generally relates to a modular manufacturing system incorporating one or more manufacturing base modules that can be arranged in various different arrangements and layouts with respect to one another to create different process flows and/or adapt shapes thereof to accommodate different manufacturing spaces.

BACKGROUND

Assembly lines can have a multitude of manufacturing stations where different operations are performed to produce a finished product. For example, additive and/or subtractive processes can be used at each of the manufacturing stations to modify an unfinished article to create the finished product. The manufacturing stations are typically arranged in a continuous serial arrangement one after another. And oftentimes, the manufacturing stations are fixed in position relative to one another in the continuous serial arrangement. Oftentimes, such assembly lines are not flexible enough to change out or easily add additional manufacturing stations to change or add additional operations thereto, and the continuous serial arrangement of such assembly lines precludes use of disjointed or weirdly-shaped manufacturing spaces. Therefore, there is a need for a modular manufacturing system easily affording modifications to an arrangement of an assembly line, and/or affording arrangements that can accommodate disjointed or weirdly-shaped manufacturing spaces. The modular manufacturing system can include one or more manufacturing base modules arranged to facilitate creation of a finished article. The modular manufacturing system can afford flexibility to change out or add additional manufacturing base modules to change or add additional operations thereto, and/or affords arrangements that can accommodate disjointed or weirdly-shaped manufacturing spaces.

SUMMARY

The techniques of this disclosure generally relate to a modular manufacturing system including one or more manufacturing base modules arranged in various different arrangements and layouts with respect to one another.

In one aspect, the present disclosure provides a method of using a modular manufacturing system, the method including providing at least three interchangeable base modules each having a first side, a second side opposite from the first side, a third side to the left of the first side, a fourth side to the right of the first side, a directional movement portion, and at least one operational attachment attached relative to at least two of the at least three base modules, the directional movement portion defining a working area for performing at least one operation on one or more articles passing through the working area, the directional movement portion being configured to move one or more platen supporting the one or more articles and loaded onto the directional movement portion from one of the first side, the second side, the third side, and the fourth side through the working area and out of another of the first side, second side, the third side, and the fourth side after the at least one operation is performed on the article; positioning a first base module of the at least three interchangeable base modules in a first position, positioning a second base module of the at least three interchangeable base modules in a second position adjacent the first base module, and positioning a third base module of the at least three interchangeable base modules in a third position adjacent the second base module; defining sides of the first base module, the second base module, and the third base module, so that the first side of the second base module is adjacent the second side of the first base module, and the first side of the third base module is adjacent the second side of the first base module; defining a first process flow arrangement by: receiving a first platen of the one or more platens supporting a first article of the one or more articles through the first side and into the working area of the first base module, moving, using the directional movement portion of the first base module, the first platen and the first article through the working area of the first base module and out of the second side of the first base module into the second base module, receiving the first platen and the first article through the first side and into the working area of the second base module and performing a first operation by a first operational attachment attached relative to the second base module, moving, using the directional movement portion of the second base module, the first platen and the first article through the working area of the second base module and out of the second side of the second base module into the third base module, receiving the first platen and the first article through the first side and into the working area of the third base module and performing a second operation by a second operational attachment attached relative to the third base module, and moving, using the directional movement portion of the third base module, the first platen and the first article through the working area of the third base module and out of one of the second side, the third side, and the fourth side of the third base module; redefining the sides of the first base module, the second base module, and the third base module, so that the first side of the second base module is adjacent the third side of the first base module, and the first side of the third base module is adjacent the fourth side of the first base module; and defining a second process flow arrangement by: receiving a second platen of the one or more platens supporting a second article of the one or more articles through the first side of the second base module, moving, using the directional movement portion of the second base module, the second platen and the second article through the working area of the second base module and out of the third side of the second base module into the third base module, receiving the second platen and the second article through the first side and into the working area of the first base module and performing the first operation by the first operational attachment attached relative to the first base module; one of removing the second platen and the second article through one of the second side, the third side, and the fourth side of the first base module, and moving, using the directional movement portion of the first base module, the second platen and the second article through the working area and out of the first side of the first base module and into the second base module; receiving the second platen and the second article through the third side and into the working area of the second base module, and moving, using the directional movement portion of the second base module, the second platen and the second article through the working area of the second base module and out of the fourth side of the second base module into the third base module; receiving the second platen and the second article through the first side and into the working area of the third base module and performing the second operation by the second operational attachment attached relative to the third base module; and one of removing the second platen and the second article through one of the second side, the third side, and the fourth side of the third base module, and moving, using the directional movement portion of the third base module, the second platen and the second article through the working area and out of the first side of the second base module and into the second base module for removal therefrom.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

The techniques of this disclosure generally relate to a modular manufacturing system.

DETAILED DESCRIPTION

Figure 1:
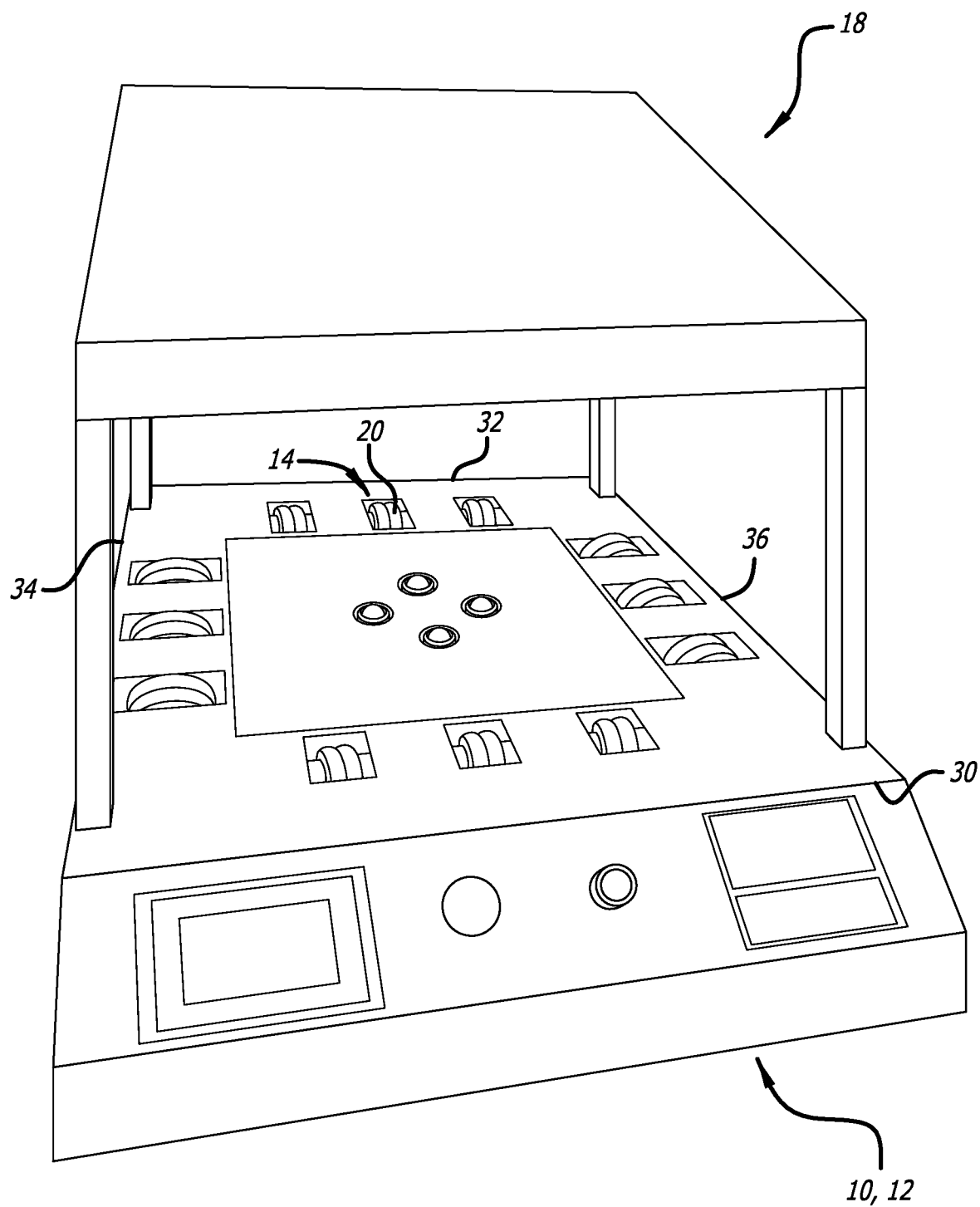
FIG. 1 is a side, perspective view of a manufacturing base module in accordance with an embodiment of the present disclosure.
Figure 2:
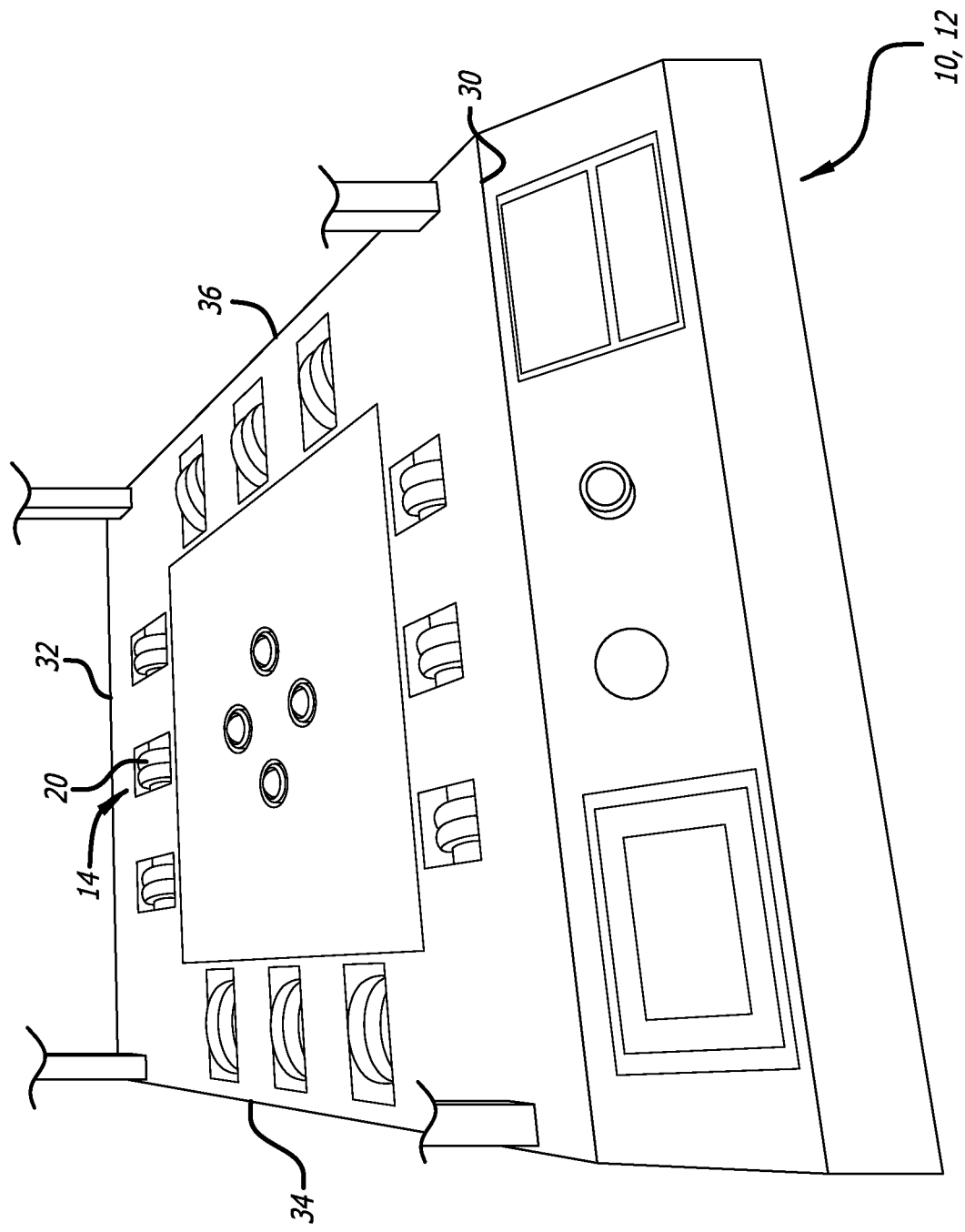
FIG. 2 is an enlarged, side, partial, perspective view of the manufacturing base module of FIG. 1 showing a conveyer portion thereof.

A modular manufacturing system and method for use thereof according to the present disclosure is generally indicated by the numeral 10 in FIGS. 3-10. The modular manufacturing system 10 can include one or more manufacturing base modules 12, as depicted in FIGS. 1 and 2, that can be used by themselves (FIG. 3) or arranged in various different arrangements and layouts (FIGS. 4-10) with respect to one another to create an assembly line including a process flow or flows to create a finished or semi-finished product. The base modules 12 can each include a conveyor portion 14 used in moving one or more platens 16 (FIGS. 3-10), and one or more operational attachments 18 for performing one or more operations on one or more articles provided on the platens 16. As depicted in FIG. 1, one of the operational attachments 18 can be positioned above the conveyer portion 14 of one of the base modules 12 to define a working area in which the platens 16 and the one or more articles provided thereon can be loaded. As discussed below, depending on the presence and/or type of operational attachments 18 included thereon, the base modules 12, for example, can operate as loading, unloading, loading/unloading, wait stations, and operational stations. The operational stations can include operational attachments 18 for performing an operation on the one or more articles provided on the platens 16.

The base module 12 can include a support portion (not shown) undergirding the conveyer portion 14 and the operational attachment 18 thereof. The support portion can include various legs (not shown) spacing the conveyer portion 14 from the ground, and can include various casters (not shown) attached to the various legs affording positioning and repositioning of the support portion on the ground. Thus, using the support portions thereof, the conveyer portions 14 and the operational portions 18 of the base modules 12 can be positioned and repositioned with respect to one another. Furthermore, the base modules 12 can also include one or more locking portions (not shown) facilitating interconnection between adjacent base modules 12.

The conveyer portion 14, as depicted in FIGS. 1 and 2, can include multi-directional movement portions 20 that afford horizontal movement of the platens 16 positioned thereon in multiple horizontal directions. The multi-directional movement portions 20 also can be used to rotate the platens 16 before and after movement thereof in the multiple horizontal directions. Exemplary multi-directional movement portions 20 can take the form of an arrangement of multi-directional or omni-directional wheels similar to those disclosed by Rotacaster Wheel Limited. And other exemplary multi-directional movement portions 20 can be provided by use of a handling apparatus disclosed in U.S. Pat. No. 6,354,208, which is hereby incorporated by reference herein. Other configurations of the multi-directional movement portions 20 also can be used.

Figure 3:
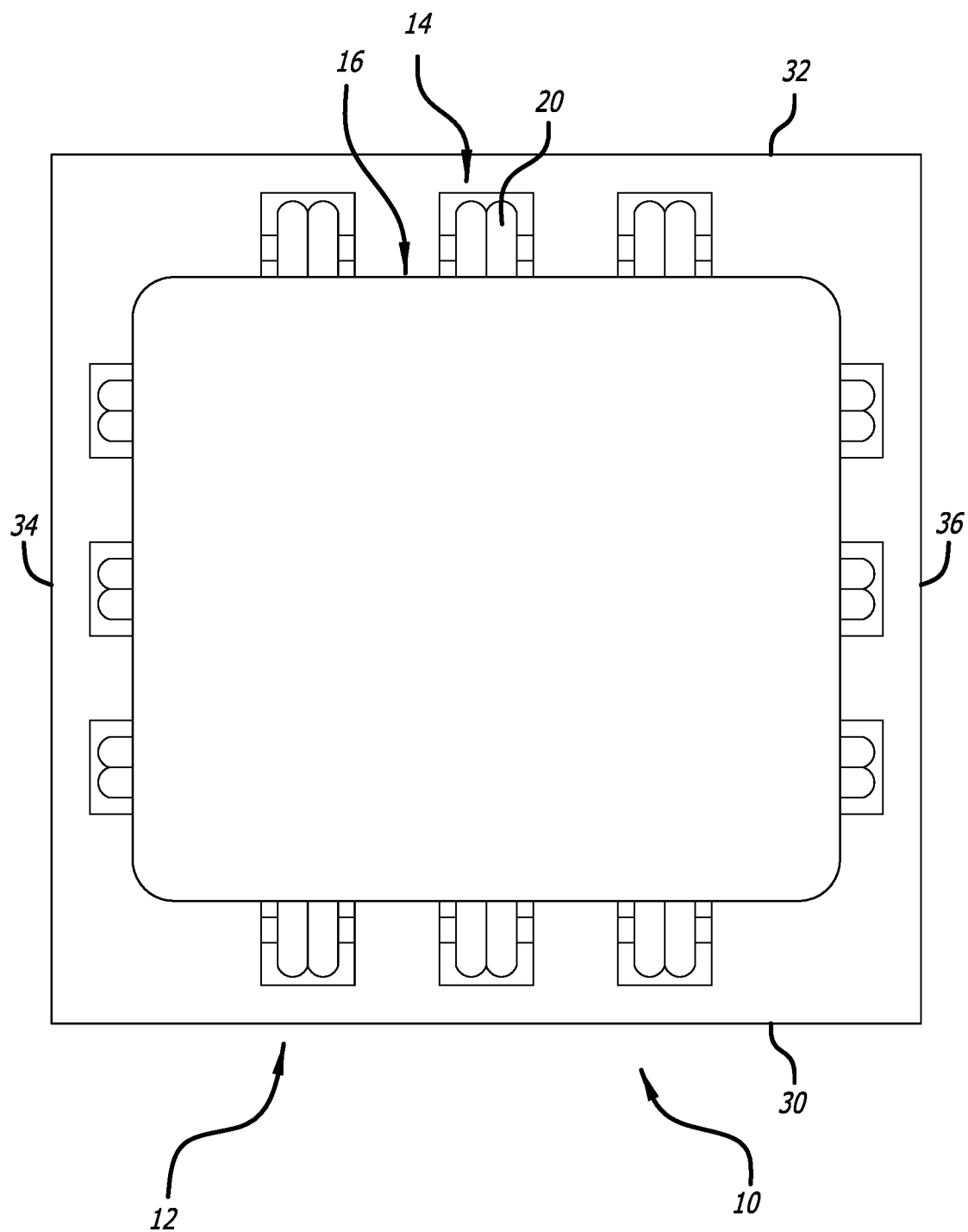
FIG. 3 is a top, plan, schematic view of a single base module.

As depicted in FIG. 3, for example, the platen 16 can enter the conveyer portion 14 from a first side 30 of the base module 12, and the platen 16 can be moved out of the conveyer portion 14 via operation of the multi-directional movement portions 20 in a forward direction out of a second side 32 opposite from the first side 30, in a reverse direction backwards through the first side 30, in a left-hand direction out of a third side 34 to the left of the first side 30, and in a right-hand direction out of a fourth side 36 to the right of the first side 30. Furthermore, the platens 16 also can enter the second side 32, the third side 34, or the fourth side 36 of the base module 12, and be moved in forward, reverse, left-hand, and right-hand directions relative to the corresponding second side 32, third side 34, or fourth side 36 thereof. And the platens 16 can be moved out of the base module 12 at angles between the first side 30, the second side 32, the third side 34, and the fourth side 36. Because the base modules 12 have four sides, the platens 16, for example, can be moved out of the base modules 12 at 45° between the first and third sides 30 and 34, between the first and fourth sides 30 and 36, between the second and third sides 32 and 34, and/or between the second and fourth sides 32 and 36. The multi-directionality of the movement afforded by the multi-directional portions 20 of the conveyer portions 14 allows flexibility in movement of the platens 16 and affords the process flow or flows in a multitude of configurations. And, while the base modules 12 depicted herein have four (4) sides through which the platens 16 can be moved, the base modules 12 are not so limited, and the base modules 12 can have more or less sides through which the platens 16 can be moved.

One or more of the base modules 12 are used in each of the embodiments discussed below, and the flexibility afforded by use of the base modules 12 allows expansion of the number of operations performed by adding additional base modules 12. The modular manufacturing system 10 can grow in size and increase from use of one base module 12 to any multitude thereof. As more of the base modules 12 are added, more operations can be performed on the article or articles using the modular manufacturing system 10. Moreover, the various arrangements and layouts (FIGS. 4-10) of the base modules 12 with respect to one another allows the modular manufacturing system 10 to take different shapes, and, in doing so, accommodate different manufacturing spaces that are potentially disjointed or weirdly-shaped. For example, the various arrangements and layouts, for example, can be uniquely shaped to accommodate L-shaped spaces, U-shaped spaces, or other undulating spaces. As such, the modular manufacturing system 10 is scalable to accommodate a multitude of different sizes and configurations thereof. The flexibility of the modular manufacturing system 10 also allows the base modules 12 and the operational attachments to be interchanged with and replaced by other base modules 12 and/or operational attachments 18 if there is a breakage with minimal down time because of such interchangeability.

As discussed below, each of the conveyor portions 14 are configured to move the platens 16 in multiple horizontal and/or vertical directions. And when multiple base modules 12 are arranged relative to one another, the conveyor portions 14 can be used to transfer the platens 16 therebetween. During operation of the modular manufacturing system 10, and depending on the arrangement of the base modules, the conveyor portion 14 can be used to transfer the platens 16 serially from one base module 12 to another base module 12, be used to transfer the platens 16 back and fourth between base modules 12, or be used in a combination of serial and back-and-forth movements. As such, the process flow or flows of the platens 16 from one operation to another operation can occur in a multitude of different directions through the modular manufacturing system 10.

One or more operations performed by the operational attachments 18 can be used in forming the finished or semi-finished products from the article or articles. For example, the articles could include fabrics, textiles, and/or garments, and the finished products afforded by the operations performed by the operational attachments 18 can facilitate application of a design to a t-shirt. To illustrate, one of the operational attachments 18 could be used for applying a pretreatment liquid to the t-shirt (via, for example, sprayer applicators, roller applicators, brush applicators, etc.), one of the operational attachments 18 could be used for application of the design on the t-shirt (via, for example, printing machines), one of the operational attachments 18 could be used for drying (via, for example, forced-air dryers, heat presses, etc.) the pretreatment liquid or the design on the t-shirt, and one of the operational attachments 18 could be used for cooling (via misting machines) the pretreatment liquid or the design on the t-shirt. One or more these operations could also be performed by a single one of the operational attachments 18. And, the application of the design can be performed via, for example, various printing processes such as direct-to-garment (DTG) printing performed by a DTG printer, screen printing performed by a screen printer, heat-transfer printing performed by a heat-transfer printer, or the like. With respect to the screen printing, multiple base modules 12 each with screen printers can be provided, and each of the multiple base modules 12 can be used to apply one or more colors via the corresponding screen printers.

While these operations can be used to facilitate application of a design on the t-shirt, the modular manufacturing system 10 is not so limited. The modular manufacturing system 10 also can be configured to perform one or more other operations on other articles to form different finished or semi-finished products. For example, the finished product could be a mixture of different ingredients, and each of the base modules 12 can be used to add a different ingredient to a container supported by a platen 16 until the finished product is created. Furthermore, for example, the finished product could be an additive manufacturing process, and each of the base modules 12 can be used to add a different component or components to a product supported by a platen 16 until the finished product is created.

The modular manufacturing system 10 can be configured to afford perpetual or recurrent movement of the platens 16 after the operations of the process flow or flows are completed. To illustrate, when the process flow is configured for serial movement, a platen 16 and an article or articles provided thereon can be entered into the process flow via loading thereof on a base module 12 at the beginning of the process flow, and be serially moved from adjacent base module 12 to adjacent base module 12 until the end of the process flow. If the serial process flow is perpetual and after the serial process flow is complete at a base module 12 at the end of the process flow, a finished or semi-finished product can be unloaded from the platen 16 and the platen 16 can be sent to the base module 12 at the beginning of the process flow for loading of a new article or articles to begin the process flow again. If the process flow is recurrent and after the serial process flow is complete at a base module 12 at the end of the process flow, a finished or semi-finished product can be unloaded with the platen 16. Thereafter, the platen 16 that was unloaded can later be entered at beginning of the serial and recurrent process flow with a new article or articles provided thereon, and/or a new platen 16 and a new article or articles provided thereon can be entered at beginning of the serial and recurrent process flow.

Furthermore, when the process flow is configured for back-and-forth movement, a platen 16 perpetually can remain in the process flow during use, and an article or articles can be loaded onto the platen 16 at a base module 12 at the beginning of the process flow, and a finished or semi-finished product can be unloaded from the platen 16 at the same base module at the ending of the process flow. And after the finished or semi-finished product is unloaded from the base module 12, a new article or articles can be loaded on the platen 16 to begin the back-and-forth and perpetual process flow again. Alternatively, rather than perpetually using the same platen 16 during the back-and-forth process flow, the base module 12 at the beginning and ending of the process flow can be loaded with a new platen 16 and a new article or articles after a previous platen 16 and the finished or semi-finished product are unloaded.

The base modules 12 can each include a control unit (not shown) including a processor or processors and non-volatile computer memory that can be configured to control at least the operation of the base modules 12 by controlling the conveyor portions 14 (and corresponding movement of the platens 16), and by controlling the performance of one or more operations of the operational attachments 18. The control units of the base modules 12 can be interconnected via wired and/or wireless connections, and configured to create a network formed by the base modules 12 affording communication between the control units via that interconnection. The network of the base modules 12 can allow information to be transferred between some or all of the control units of the base modules 12, but at least the control units of the adjacent base modules 12 can communicate with one another and transfer information therebetween. Embodiments of the modular manufacturing system 10 can afford control of the base modules 12 in a centralized or a decentralized manner to afford the process flow or flows as discussed below to create the finished or semi-finished products. When centralized, at least one of the control units and/or an interconnected control computer (not shown) communicating with the control units can be used to control operation of the base modules 12. When decentralized, each of the control units can control operation of the corresponding base modules 12 independently from the other base modules 12.

With at least the control units of the adjacent base modules 12 interconnected and communicating with one another, the control units via programming thereof can receive information including, for example, statuses of whether the platens 16 and/or the article or articles provided thereon are loaded on the base modules 12, relative locations (i.e., the arrangement and layout) of the base modules 12, directions of movement afforded by the arrangement and layout of the base modules 12, and/or types of operational attachments 18 attached to the base modules 12. The information communicated between the base modules 12 can be regarding some or all of the base modules 12 in the network, or be limited to that of only the adjacent base modules 12.

To determine the statuses, relative locations, directions of movement, and types of operational attachments, the base modules 12 can include tracker elements (not shown) and corresponding sensor/detector elements (not shown) for detecting the tracker elements. The tracker elements, for example, can be radio-frequency identification (RFID) and/or optical identifiers, and the tracker elements can be attached to the platens 16 and/or the article or articles provided thereon, can be attached to the sides of the base modules 12 to indicate different sides thereof, and can be attached to the operational attachments 18 to indicate different types thereof. And the sensor/detector elements, for example, can be RFID and/or optical scanners, and can be used by the control units to sense the presence of the corresponding tracker elements. Besides the RFID and/or optical identifiers attached to the platens 16 and/or the article or articles described above, other sensors/detectors (not shown) such as, for example, acoustic, optical, radio-frequency, visual, and/or weight sensors can be used by the control units of the base modules 12 to recognize whether platens 16 and/or the article or articles provided thereon are loaded on the base modules 12.

To illustrate, when a first and a second of the base modules 12 are positioned adjacent to one another, the interaction between the tracker elements and the sensor/detector elements can be used to allow the control units thereof to recognize which of their sides are adjacent to one another, and which of the operational attachments 18 are attached thereto. The control units, using these recognizations, can determine information such as, for example, the arrangement and layout of the base modules 12, the directions of possible movement afforded by the arrangement and layout of the base modules 12, and/or the types of operational attachments 18 attached to the base modules 12. Furthermore, the interaction between the tracker elements and the sensor/detector elements, and/or the use of the other sensors/detectors can be used to recognize whether the platens 16 and/or the article or articles provided thereon are loaded on the base modules 12. And the control units, using these recognitions, can determine information regarding whether the base modules 12 are ready to send or ready to receive the platens 16. This information can be communicated to some or all of the base modules 12 in the network thereof.

Additionally, one or more of the control units can include a control panel (not shown) that allows an operator to control activation and deactivation of any or all of the base modules 12. Additionally, the control panels can allow the operator to enter information regarding, for example, the arrangement and layout of the base modules 12, the directions of possible movement afforded by the arrangement and layout of the base modules 12, and/or the types of operational attachments 18 attached to the base modules 12. With such information determined and/or entered, and if control of the base modules 12 is centralized, at least one of the control units and/or the interconnected control computer communicating with the control units can be used to generate a possible process flow or flows for the platens 16 between the base modules 12 through the modular manufacturing system 10 including possible beginnings and the endings of the process flow or flows, and possible directions of the process flow or flows. Then, for example, the control units 12 and/or the interconnected control computer can automatically decide the process flow or flows depending on the above-discussed determined and/or entered information according to a preconfigured hierarchy of possibilities recognized by the control units, or the operator can select and enter the selected process flow or flows of the platens 16 between the base modules 12 using the control panels. Either way, the operator also can specify particulars about operations performed by the operational attachments 18 including (including if operation of the specified operational attachments 18 are to be activated or skipped) using the control panels.

When control of the control modules 12 is centralized, at least one of the control units and/or the interconnected control computer can be programmed to control operation of each of the base modules 12 to afford cooperation therebetween in a centralized manner. At least one of control units and/or the interconnected control computer can control operation of each of the base modules by controlling movement of the platens 16 via serial and/or back-and-forth movements using the conveyor portions 14, and controlling operation of the operational attachments 18. If centralized, at least one of the control units and/or the interconnected control computer can rely on the interaction between the tracker elements and the sensor/detector elements, and/or the use of the other sensors/detectors to recognize whether platens 16 and/or the article or articles provided thereon are loaded on the base modules 12. And the control units, using these recognitions, can determine information regarding whether the base modules 12 are ready to send or ready to receive the platens 16. This information can be used by at least one of the control units and/or the interconnected control computer to control movement of the platens 16 and the article or articles provided thereon between the base modules 12.

Furthermore, when control of the base modules 12 is decentralized, each of the control units of the base modules 12 can be programmed to operate in an independent control cycle, and the independent control cycles of adjacent base modules 12 can afford cooperation therebetween in a decentralized manner. The independent control cycles of the control units of the base modules 12 can each be based on ready to receive and ready to send determinations regarding receiving and sending the platens 16 and the article or articles provided thereon, and these determinations can be communicated to adjacent base modules 12. As discussed below, the cooperation between the base modules 12 facilitated by each of the base modules 12 running the independent control cycles and communication between the adjacent base modules 12 can control movement of the platens 16 via serial and/or back-and-forth movements using the conveyer portions 14.

At each of the base modules 12 running the independent control cycles, it can be first determined by the control unit if the base module 12 is ready to receive or ready to send a platen 16 and an article or articles provided thereon. The ready to receive determination can be based on the above-discussed recognition if a platen 16 and an article or articles provided thereon are loaded on the base module 12, and the ready to send determination can be based on the recognition, as discussed above, if a platen 16 and an article or articles provided thereon is loaded on the base module 12, and on the presence and/or type of the operational attachment 18 and if the operation or operations of the base module 12 are complete.

If ready to receive, but not ready to send, a base module 12 recognizes that it does not have a platen 16 and an article or articles provided thereon loaded on the base module 12, and the base module 12 then communicates these determinations to the adjacent base modules 12. A platen 16 and an article or articles provided thereon can then be sent from the adjacent base modules 12 to this base module 12. And if not ready to receive and not ready to send, a base module 12 recognizes that it does have a platen 16 and an article or articles provided thereon already loaded on the base module 12, and thereafter, can perform, if necessary, an operation or operations on an article or articles provided on the platen 16 until the operation or operations are complete. The base module 12 then communicates that it is not ready to receive, but ready to send to the adjacent base modules 12.

The operation of the independent control units can also take into account the operation or operations that the base module 12 is configured to perform. To illustrate, for a base module 12 that is a loading station (positioned at the beginning of the process flow), once a platen 16 and an article or articles provided thereon are loaded on the base module 12, the ready to send determination for the loading station would be affirmative.

For a base module 12 that is an unloading station (positioned at the ending of the process flow), once a platen 16 and a finished or semi-finished product provided thereon are loaded on the base module 12, the finished or semi-finished product, or the platen 16 and the finished or semi-finished product are unloaded from the unloading station. For example, for a process flow that is serial and perpetual, the finished or semi-finished product can be unloaded from the platen 16, and the ready to send determination would be affirmative; and for a process flow that is serial and recurrent, the platen 16 and the finished or semi-finished product are unloaded from the unloading station, and the ready to send determination would be negative as it is configured for unloading.

For a base module 12 that is a loading/unloading station (positioned at the beginning and ending of the process flow), once a platen 16 and an article or articles provided thereon are loaded on the base module 12, the ready to send determination for the loading/unlading station would be affirmative, and once the platen 16 and the finished or semi-finished product provided thereon are loaded on the base module 12, the finished or semi-finished product is unloaded from the platen 16 or the platen 16 and the finished or semi-finished product provided thereon are unloaded from the base module 12 to end the process flow. Correspondingly, the same platen 16 can then be reloaded with a new article or articles or a new platen 16 and a new article or articles provided thereon can be loaded onto the base module 12 to begin the process flow, and the ready to send determination for the loading/unloading station would be affirmative For a base module 12 that is a wait station (positioned within the process flow), once a platen 16 and an article or articles are loaded on the base module 12, the ready to send determination for the waiting station would be affirmative. Furthermore, for other base modules 12 (positioned within the process flow) that are operational stations, once a platen 16 and an article or articles provided thereon are loaded on the base module 12, the ready to send determination would be affirmative after the operation or operations on the article or articles provided on the platen 16 by the corresponding operational attachment 18 are complete.

As such, after it is determined by these differently-configured base modules 12 that they are ready to send, the ready to send determination can be communicated to adjacent base modules 12, and the platen 16 and the article or articles provided thereon can be sent to one of the adjacent base modules 12 that is ready to receive.

Using the operation of the independent control cycles of the base modules 12 and the communication of the ready to receive and ready to send determinations between the adjacent base modules 12, a platen 16 and an article or articles provided thereon can circulate between the base modules 12 and progress from the beginnings to the endings of the process flow or flows to produce a finished or semi-finished product. The progress of the platen 16 and the article or articles can follow serial and/or back-and-forth movements through the process flow or flows.

For example, when a first and a second of the base module 12 are positioned adjacent to one another for serial and recurrent movement of a platen 16, the first and second base modules 12 can be running the independent control cycles and be used to together, for example, to facilitate application of a pretreatment liquid to a first t-shirt provided on a first platen 16. The first base module 12 can be for loading, and the second base module 12 can include an operational attachment 18 for applying pretreatment to the first t-shirt provided on the first platen 16. After application of the pretreatment, the platen 16 and the first t-shirt can be unloaded from the second base module 12

When the independent control cycles are activated, the control units of the first and second base modules 12 configured for serial and recurrent movement can first communicate with one another the ready to receive and ready to send determinations. If the control unit of the first base module 12 running the independent control cycle determines that the first base module 12 is to ready receive, but not ready to send, it waits for a first platen 16 and a first t-shirt provided thereon to be loaded on the first base module 12. The interaction between the tracker elements and the sensor/detector elements, and/or the other sensors/detectors can be used to recognize whether the first platen 16 and the first t-shirt provided thereon is loaded on the first base module 12. After receipt of the first platen 16 and the first t-shirt, the first base module 12 (because it is used for loading) is deemed by the independent control cycle to be ready to send the first platen 16 and the first t-shirt. Then, the control unit of the first base module 12 communicates to the control unit of the second base module 12 that it is ready to send the first platen 16 and the first t-shirt. Thereafter, the first base module 12 sends the first platen 16 and the first t-shirt to the second base module 12 if the second base module 12 is deemed by the control unit thereof that it is ready to receive.

A similar process is repeated at the second base module 12. If the control unit of the second base module 12 running the independent control cycle determines that the second base module 12 is ready to receive, but not ready to send, it waits for the first platen 16 and the first t-shirt provided thereon to be sent to the second base module 12. The interaction between the tracker elements and the sensor/detector elements, and/or the other sensors/detectors can be used to recognize whether the first platen 16 and the first t-shirt provided thereon is loaded on the second base module 12. After receipt of the first platen 16 and the first t-shirt, the second base module 12 (because it is used for applying the pretreatment) activates the operational attachment 18 to apply the pretreatment to the first t-shirt provided on the first platen 16. Then, after the pretreatment is applied to the first t-shirt, the second base module 12 is deemed by the independent control cycle to be ready to send the first platen 16 and the first t-shirt. Because the second base module 12 is also used for unloading, the first platen 16 and the first t-shirt can be unloaded therefrom. The serial and recurrent movement can continually be repeated to facilitate application of pretreatment to t-shirts by loading successive platens 16 and new t-shirts provided thereon into the first base module 12, and sending the successive platens 16 and the new t-shirts to the second base module 12 for application of the pretreatment and then unloading therefrom.

Furthermore, when a first and a second of the base modules 12 are positioned adjacent to one another for back-and-forth and perpetual movement of a platen 16, the first and second base modules 12 can be running the independent control cycles and likewise be used together, for example, to facilitate application of a pretreatment liquid to a first t-shirt provided on a first platen 16. The first base module 12 can be for loading/unloading, and the second base module 12 can include an operational attachment 18 for applying pretreatment to the first t-shirt provided on the first platen 16. After application of the pretreatment, the first platen 16 and the first t-shirt can be returned to the first base module 12 for unloading the first t-shirt from the first platen 16 and loading a second t-shirt on the first platen 16.

When the independent control cycles are activated, the control units of the first and second base modules 12 configured for back-and-forth and perpetual movement can first communicate with one another the ready to receive and ready to send determinations. If the control unit of the first base module 12 running the independent control cycle determines that the first base module 12 is ready to receive, but not ready to send, it waits for the first platen 16 and/or the first t-shirt to be loaded thereon. The interaction between the tracker elements and the sensor/detector elements, and/or the other sensors/detectors can be used to recognize whether the first platen 16 and/or the first t-shirt thereon are loaded on the first base module 12. After receipt of the first platen 16 and the first t-shirt, the first base module 12 (because it is used for loading/unloading) is deemed by the independent control cycle ready to send the first platen 16 and the first t-shirt. Then, the control unit of the first base module 12 communicates to the control unit of the second base module 12 that it is ready to send the first platen 16 and the first t-shirt. Thereafter, the first base module 12 sends the first platen 16 and the first t-shirt to the second base module 12 if the second base module 12 is deemed by the control unit thereof ready to receive.

A similar process is repeated at the second base module 12. If the control unit of the second base module 12 running the independent control cycle determines that the second base module 12 is not ready to send the first platen 16 and the first t-shirt, it waits for the first platen 16 and the first t-shirt provided thereon to be sent to the second base module. The interaction between the tracker elements and the sensor/detector elements, and/or the other sensors/detectors can be used to recognize whether the first platen 16 and the first t-shirt provided thereon are loaded on the second base module 12. After it is recognized that the first platen 16 and the first t-shirt provided thereon are loaded on the second base module 12, the second base module 12 (because it is used for applying the pretreatment) activates the operational attachment 18 to apply the pretreatment to the first t-shirt provided on the platen 16. Then, after the pretreatment is applied to the first t-shirt, the control unit of the second base module 12 communicates with the control unit of the first base module 12 that it is ready to send the first platen 16 and the first t-shirt. When the second base module 12 is deemed ready to send and the first base module 12 is deemed ready to receive, the second base module 12 sends the first platen 16 and the first t-shirt provided thereon back to the first base module 12. At the first base module 12, the first t-shirt sent back from the second base module 12 then can be unloaded from the first platen 16, and a second t-shirt can be loaded on the first platen 16 and the process can be repeated. The back-and-forth and perpetual movement can be perpetual by continually unloading the t-shirts after the operations thereon are complete, and continually loading new t-shirts on the platen 16.

Accordingly, the operations of the independent control cycles are focused on the ready to receive and ready to send determinations of the control units of the adjacent base modules 12. The interaction between the adjacent base modules 12 is effectively controlled based on these determinations. A multitude of the base modules 12 can be arranged relative to one another, and the interactions between adjacent base modules 12 based on these determinations allow the adjacent base modules 12 to operate independently yet cooperatively with one another. Thus, accounting for the presence and type of the operational attachments, the independent control cycles programmed into the control units of the base modules 12 can be identical or substantially identical, and correspondingly, can operate in identical or substantially identical ways based on the ready to receive and ready to send determinations. In doing so, the multitude of base modules 12 can operate in a decentralized manner using the independent control cycles, Embodiments of the modular manufacturing system 10 can include one or more of the base modules 12 positioned relative to one another. As described above, each of the base modules can be configured to perform operations such as a loading, unloading, loading/waiting, and waiting, and/or can be equipped with operational attachments 18 to perform an operation on an article (such as, for example, the t-shirt) provided on the platen 16. When loading, for example, t-shirts can be loaded on platens 16 already loaded on the base modules 12, or platens 16 with t-shirts already provided thereon can be loaded on the base modules 12. Furthermore, as discussed above, the operations performed by the operational attachments 18, for example, can include an application operation for applying pretreatment liquid to the t-shirt, a drying process for drying the pretreatment onto the t-shirt, an application operation for applying of the design to the t-shirt, and/or a drying process for drying the design on the t-shirt. During the process flow or flows thereof, a platen 16 and a t-shirt provided thereon can be loaded on an initial base module 12 for an operation or operations performed by the initial base module 12 itself or an initial operational attachment 18 attached thereto, and then the platen 16 and the t-shirt can be sent to a subsequent base module or modules 12 according to the arrangement thereof for additional operations performed by the subsequent base modules 12 themselves and/or by subsequent operational attachments 18 attached thereto. This process can be followed for as many of the base modules 12 that are utilized. After completion of the operation or operations by the last base module 12 in the process flow and/or by a last operational attachment 18 attached to the last base module 12 in the process flow, the platen 16 and/or the t-shirt can be unloaded from the last base module 12 as described above. While the removal of the platens 16 and/or the t-shirts will typically occur at the last base module 12 in the process flow, removal also can occur at open sides of the base modules 12 along and after partial completion of the process flow, and can occur when use of the modular manufacturing system 10 requires interruption. Furthermore, the operations (besides loading, unloading, loading/unloading or waiting) performed at the base modules 12 could be skipped as the platen 16 and the t-shirt are moved therethrough. If necessary, an operation or operations with or without use of the operational attachments 18 can be performed on the t-shirts provided on the platens 16 at the base modules 12 during the process flow or flows.

Figure 4:
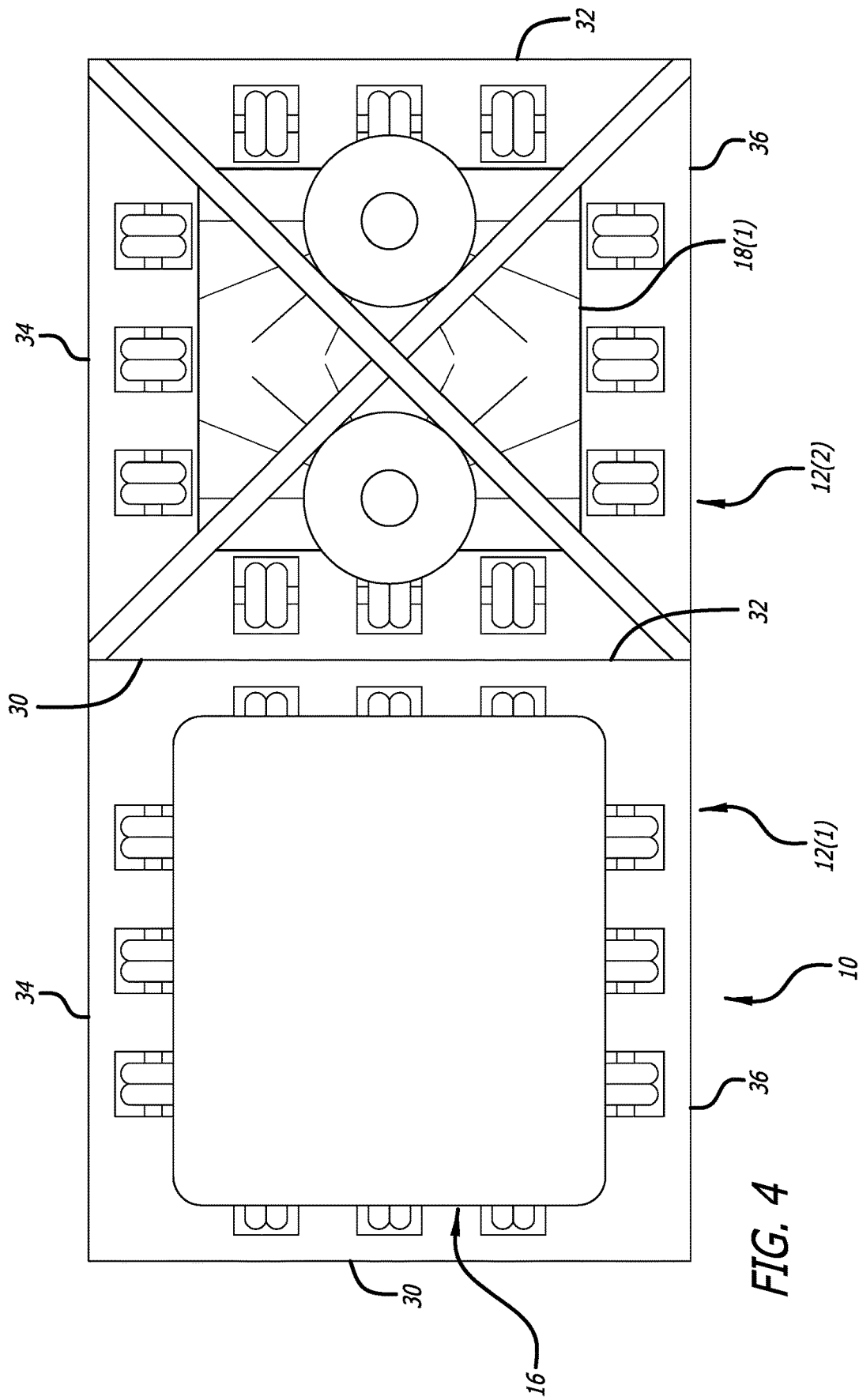
FIG. 4 is a top, plan, schematic view of an arrangement of two base modules.

As depicted in FIG. 4, an embodiment of the modular manufacturing system 10 can include two of the base modules 12 positioned adjacent to one another. A first base module 12(1) and then a second base module 12(2) are arranged left to right in FIG. 4, with the first side 30 of the second base module 12(2) positioned adjacent the second side 32 of the first base module 12(1).

As described above, control of each of the first base module 12(1) and the second base module 12(2) can be centralized or decentralized. Using the centralized or decentralized control, a platen 16 and an article (such as, for example, a t-shirt) provided thereon can be sent between the first base module 12(1) and the second base module 12(2) to progress from the beginning to the ending of the process flow to produce a finished or semi-finished product. In particular, when decentralized, the control units of each of the first base module 12(1) and the second base module 12(2) can be running the independent control cycle, and using the independent control cycles, the first base module 12(1) and the second base module 12(2) can cooperate with one another to move the platen 16 and the t-shirt from the beginning to the ending of the process flow using the above-discussed ready to receive and ready to send determinations.

As depicted in FIG. 4, the first base module 12(1) can perform a first operation and the second base module 12(2) can perform a second operation. During use, the platen 16 and the t-shirt provided thereon can enter the first base module 12(1) from the first side 30, the third side 34, or the fourth side 36 thereof, then the platen 16 and the t-shirt provided thereon can be sent through the second side 32 of the first base module 12(1) and enter into the second base module 12(2) from the first side 30 of the second base module 12(2). Thereafter, the platen 16 and the t-shirt provided thereon can be unloaded from the second side 32, the third side 34, and the fourth side 36 of the second base module 12(2) when the first base module 12(1) and the second base module 12(2) are configured for serial and recurrent movement of the platen 16 and the t-shirt, or returned to the first base module 12(1) for removal of the t-shirt from the first side 30, the third side 34, or the fourth side 36 of the first base module 12(1) when the first base module 12(1) and the second base module 12(2) are configured for back-and-fourth and perpetual movement of the platen 16. As such, the platen 16 and the t-shirt provided thereon can enter the first base module 12(1) for a first operation with respect to the platen 16 and the t-shirt, and then can be sent to the second base module 12(2) for a second operation with respect to the platen 16 and the t-shirt, and optionally, the platen 16 and the t-shirt provided thereon can be returned to the first base module 12(1) for the first operation. As such, the process flow can be serial or back-and-forth using the arrangement of FIG. 4.

For example, when using an embodiment of the modular manufacturing system 10 employing two of the base modules 12, the first base module 12(1) can be used for loading and unloading of the platen 16 and/or the t-shirt provided thereon, and the second base module 12(2) can incorporate a first operational attachment 18(1) that is used for applying the pretreatment liquid to the t-shirt. During use, the platen 16 and the t-shirt can be loaded onto the first base module 12(1) from the first side 30, the third side 34, or the fourth side 36 thereof, and then the platen 16 and the t-shirt provided thereon can be sent though the second side 32 of the first base module 12(1) and enter into the second base module 12(2) from the first side 30 of the second base module 12(2). At the second base module 12(2), the pretreatment can be applied to the t-shirt by the first operational attachment 18(1), and the platen 16 and the t-shirt can be unloaded from the open sides of the second base module 12(2) via the second side 32, the third side 34, or the fourth side 36. Thus, the process flow in FIG. 4 can be serial from the first base module 12(1) to the second base module 12(2), and such serial movement can be recurrent by having the operator continually loading successive platens 16 and new t-shirts provided thereon into the first base module 12(1), sending the successive platens 16 and the new t-shirts to the second base module 12(2) for the operation or operations on the new t-shirts, and then unloading the successive platens 16 and the new-shirts from the second base module 12(2) after the operations or operations are complete.

Alternatively, for example, when using an embodiment of the modular manufacturing system 10 employing two of the base modules 12, the platen 16 and the t-shirt provided thereon can be returned to the first base module 12(1) from the second base module 12(2) after the operation or operations on the t-shirt are complete. Then, the t-shirt provided thereon can be unloaded from the open sides of the first base module 12(1) via the first side 30, the third side 34, or the fourth side 36, and the platen 16 can be reloaded with a new t-shirt. Thus, the process flow in FIG. 4 also can be back-and-forth between the first base module 12(1) and the second base module 12(2), and such back-and-forth movement can be perpetual by having the operator continually loading and unloading the t-shirts from the platen 16 at the first base module 12(1) after the operation or operations thereon are complete at the second base module 12(2).

Figure 5:
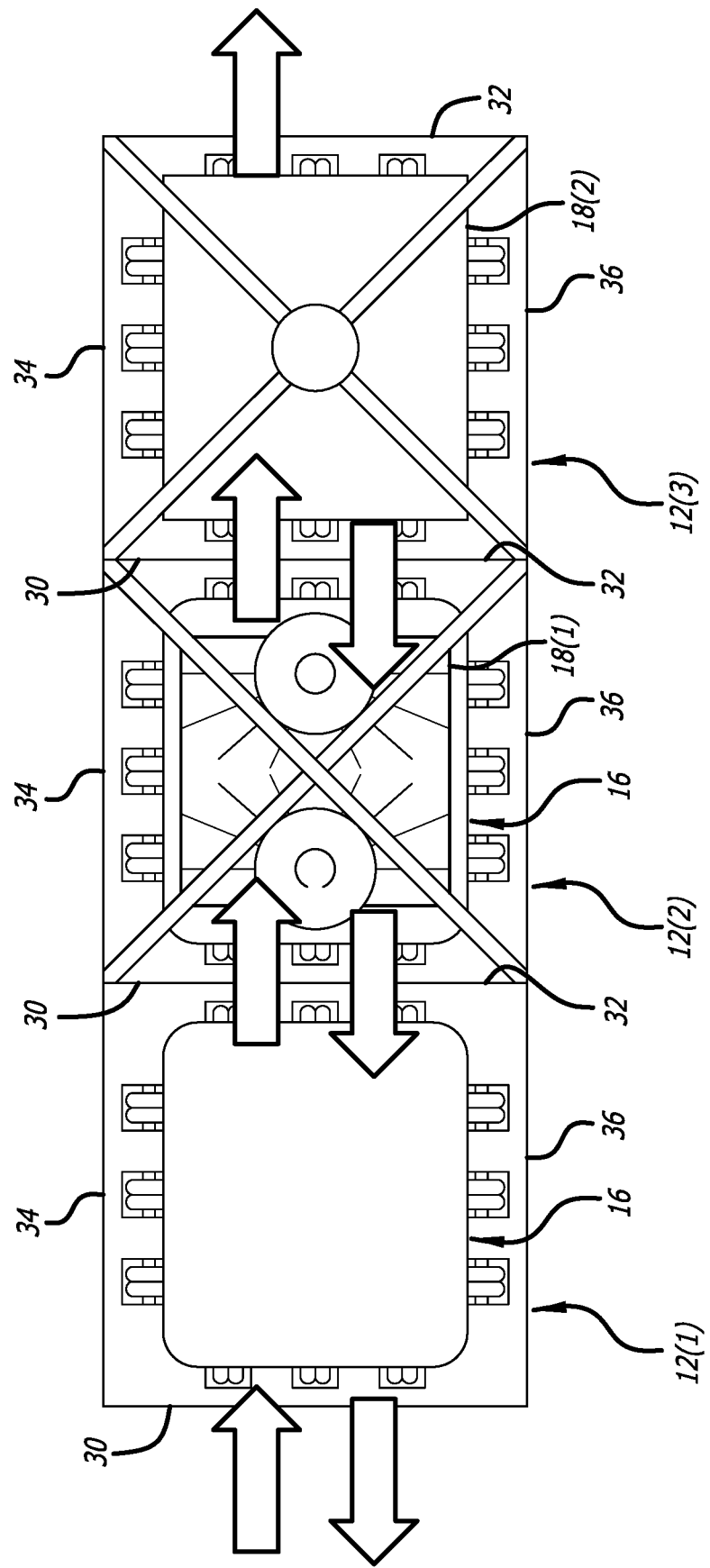
FIG. 5 is a top, plan, schematic view of an arrangement of three base modules with process flow(s) thereof beginning at the left-most of three base modules.

As depicted in FIG. 5, an embodiment of the modular manufacturing system 10 can include three of the base modules 12 positioned with respect to another. The first base module 12(1), then the second base module 12(2), and then a third base module 12(3) are arranged left to right in FIG. 5, with the first side 30 of the second base module 12(2) positioned adjacent the second side 32 of the first base module 12(1), and the first side 30 of the third base module 12(3) positioned adjacent the second side 32 of the second base module 12(2).

As described above, control of each of the first base module 12(1), the second base module 12(2), and the third base module 12(3) can be centralized or decentralized. Using the centralized or decentralized control, a platen 16 and an article (such as, for example, a t-shirt) provided thereon can be sent between the first base module 12(1), the second base module 12(2), and the third base module 12(3) to progress from the beginning to the ending of the process flow to produce a finished or semi-finished product. In particular, when decentralized, the control units of each of the first base module 12(1), the second base module 12(2), and the third base module 12(3) can be running the independent control cycle, and using the independent control cycles, the first base module 12(1), the second base module 12(2), and the third base module 12(3) can cooperate with one another to move the platen 16 and the t-shirt from the beginning to the ending of the process flow using the above-discussed ready to receive and ready to send determinations.

As depicted in FIG. 5, the first base module 12(1) can perform a first operation, the second base module 12(2) can perform a second operation, and the third base module 12(3) can perform a third operation. During use, the platen 16 and the t-shirt provided thereon can enter the first base module 12(1) from the first side 30, the third side 34, or the fourth side 36, then the platen 16 and the t-shirt provided thereon can be sent through the second side 32 of the first base module 12(1) and enter into the second base module 12(2) from the first side 30 of the second base module 12(2), and then the platen 16 can be sent through the second side 32 of the second base module 12(2) and enter into the through the third base module 12(3) from the first side 30 of the third base module 12(3). Thereafter, the platen 16 and the t-shirt provided thereon can be unloaded from the second side 32, the third side 34, or the fourth side 36 of the third base module 12(3) when the first base module 12(1), the second base module 12(2), and the third base module 12(3) are configured for serial and recurrent movement of the platen 16 and the t-shirt, or returned to the second base module 12(2) for removal from the third side 34 or the fourth side 36 of the second base module 12(2), or returned to the first base module 12(1) for removal from the first side 30, the third side 34, or the fourth side 36 of the first base module 12(1) when the first base module 12(1), the second base module 12(2), and the third base module 12(3) are configured for back-and-forth and perpetual movement of the platen 16. As such, the platen 16 and the t-shirt provided thereon can enter the first base module 12(1) for the first operation with respect to the platen 16 and the t-shirt, then can be sent to the second base module 12(2) for the second operation with respect to the platen 16 and the t-shirt, and then can be sent to the third base module 12(3) for the third operation with respect to the platen 16 and the t-shirt, and optionally, the platen 16 and the t-shirt provided thereon can be returned to the second base module 12(2) for the second operation, and returned to the first base module 12(1) for the first operation. As such, the process flow can be serial or back-and-forth using the arrangement of FIG. 5.

For example, when using an embodiment of the modular manufacturing system 10 employing three of the base modules 12, the first base module 12(1) can be used for loading of the platen 16 and the t-shirt, then the platen 16 and the t-shirt can be sent to the second base module 12(2) for application of the pretreatment liquid to the t-shirt via operational of the first operational attachment 18(1) (attached to the second base module 12(2)), and then the platen 16 and the t-shirt can be sent to the third base module 12(3) for performance of the drying process via operation of a second operational attachment 18(2) (attached to the third base module 12(3)). Thereafter, the platen 16 and the t-shirt can be unloaded from the third base module 12(3), returned to the second base module 12(2) for removal, or returned to the first base module 12(1) for removal. Thus, if the serial process flow ends at the third base module 12(3), the process flow can be recurrent by having the operator continually loading successive platens 16 and new t-shirts provided thereon into the first base module 12(1), and sending the successive platens 16 and the new t-shirts to the second base module 12(2) and then the third base module 12(3) for the operation or operations on the new t-shirts. Furthermore, if the back-and-forth process flow ends at the first base module 12(1) or the second base module 12(2), the process flow can be perpetual by having the operator continually loading and unloading the t-shirts after of the operation or operations thereon are complete.

Figure 6:
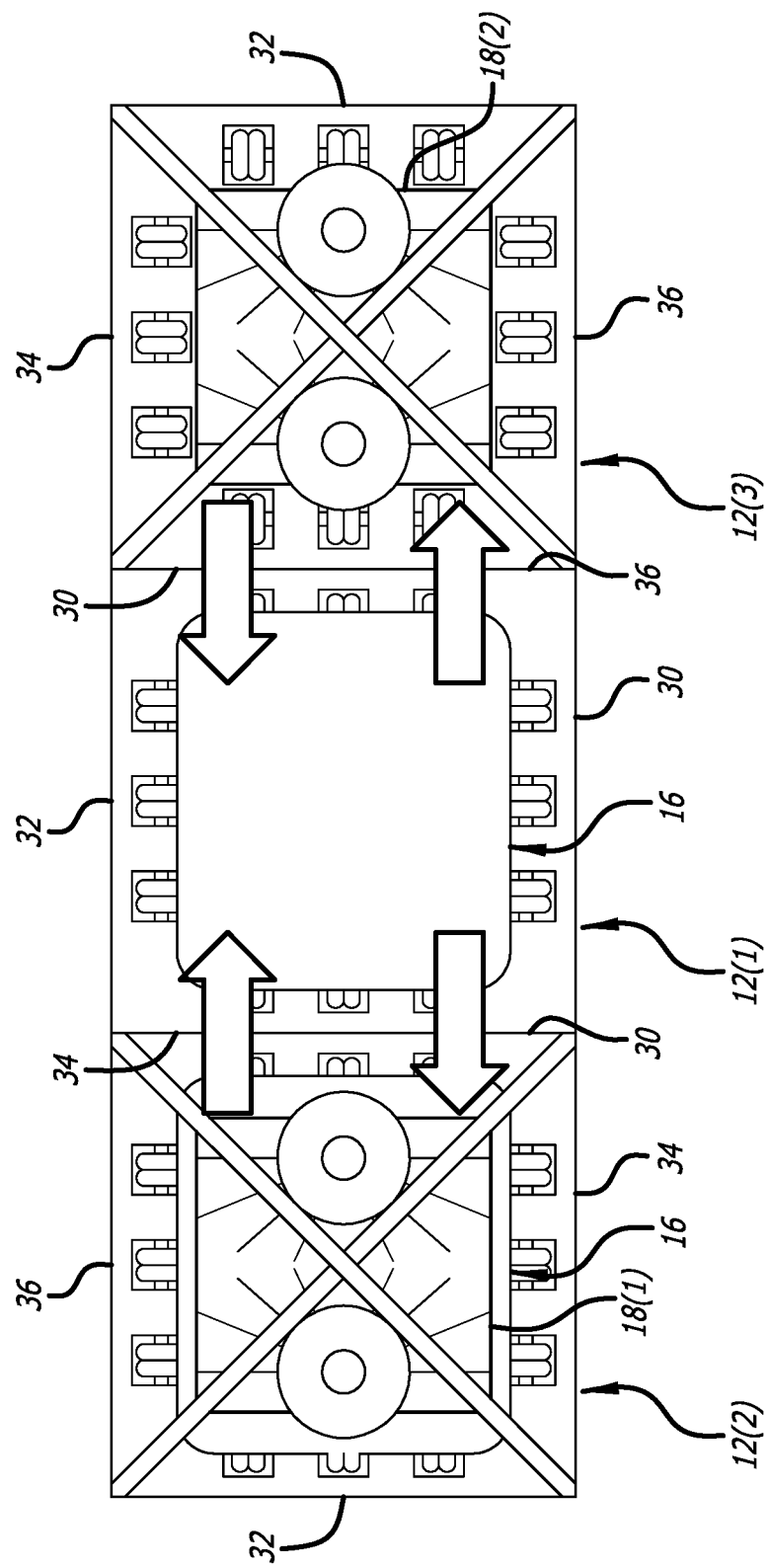
FIG. 6 is a top, plan, schematic view of an arrangement of three base modules with process flow(s) beginning at the middle of the three base modules.

As depicted in FIG. 6, an embodiment of the modular manufacturing system 10 also includes three of the base modules 12 arranged with respect to one another, but the arrangement of the base modules 12 is different than in FIG. 5. To illustrate, the first base module 12(1) is positioned between the second base module 12(2) and the third base module 12(3), with the first side 30 of the second base module 12(2) positioned adjacent the third side 34 of the first base module 12(1), and the first side 30 of the third base module 12(3) positioned adjacent the fourth side 36 of the first base module 12(1).

As described above, control of each of the first base module 12(1), the second base module 12(2), and the third base module 12(3) can be centralized or decentralized. Using the centralized or decentralized control, a platen 16 and an article (such as, for example, a t-shirt) provided thereon can be sent between the first base module 12(1), the second base module 12(2), and the third base module 12(3) to progress from the beginning to the ending of the process flow to produce a finished or semi-finished product. In particular, when decentralized, the control units of each of the first base module 12(1), the second base module 12(2), and the third base module 12(3) can be running the independent control cycle, and using the independent control cycles, the first base module 12(1), the second base module 12(2), and the third base module 12(3) can cooperate with one another to move the platen 16 and the t-shirt from the beginning to the ending of the process flow using the above-discussed ready to receive and ready to send determinations.

As depicted in FIG. 6, the first base module 12(1) can perform a first operation and each of the second base module 12(2) and the third base module 12(3) can each perform a second operation. During use, first platen 16 and a first t-shirt provided thereon can enter the first base portion 12(1) from the first side 30, and then can be sent through the third side 34 and the fourth side 36 of the first base portion 12(1) to the second base module 12(2) (via the first side 30 thereof) or the third base module 12(3) (via the first side 30 thereof), respectively. The first platen 16 and the first t-shirt provided thereon can enter the first base module 12(1) for the first operation to the first t-shirt, and then can be sent to one of the second base module 12(2) and the third base module 12(3) for the second operation to the t-shirt. And, while the first platen 16 and the first t-shirt are in the one of the second base module 12(2) and the third base module 12(3), a second platen 16 and a second t-shirt can enter the first base module 12(1) for the first operation to the second t-shirt, and then can be sent to the other of the second base module 12(2) and the third base module 12(3) for the second operation to the t-shirt. As such, the first base module 12(1), the second base module 12(2), and the third base module 12(3) are configured for back-and-forth and perpetual movement of the first platen 16 and the second platen 16.

For example, the first base module 12(1) can be used for loading of the platen 16 and the t-shirt, then the first platen 16 and the first t-shirt can be sent to one of the second base module 12(2) for application of the pretreatment liquid to the t-shirt via operation of the first operational attachment 18(1) (attached to the second base module 12(2)) and the third base module 12(3) for application of the pretreatment liquid to the first t-shirt via operation of the second operational attachment 18(2) (attached to the third base module 12(3)). After application of the pretreatment liquid to the first t-shirt, the second t-shirt returns to the first base module 12(1) for removal when the first base module 12(1) is open. To avoid interference, while the first platen 16 and the first t-shirt are in the one of the second base module 12(2) and the third base module 12(3), the second platen 12 and the second t-shirt can be sent to the other of the second base module 12(2) and the third base module 12(3) for application of the pretreatment liquid. Thus, the process flow in FIG. 6 can be back-and-forth from the first base module 12(1) to the second base module 12(2), and back-and-forth from the first base module 12(1) to the third base module 12(3) for different platens 16, and such back-and-forth movement can be perpetual by having the operator continually loading and unloading the t-shirts after the operation or operations thereon are complete. To illustrate, once returned to the first base module 12, the first t-shirt can be unloaded from the first platen 16 and the second t-shirt can be unloaded from the second platen 16, and the first platen 16 and the second platen 16 can be loaded with new t-shirts to repeat the back-and-forth and perpetual process flow for the new t-shirts on the first platen 16 and the second platen 16.

Figure 7:
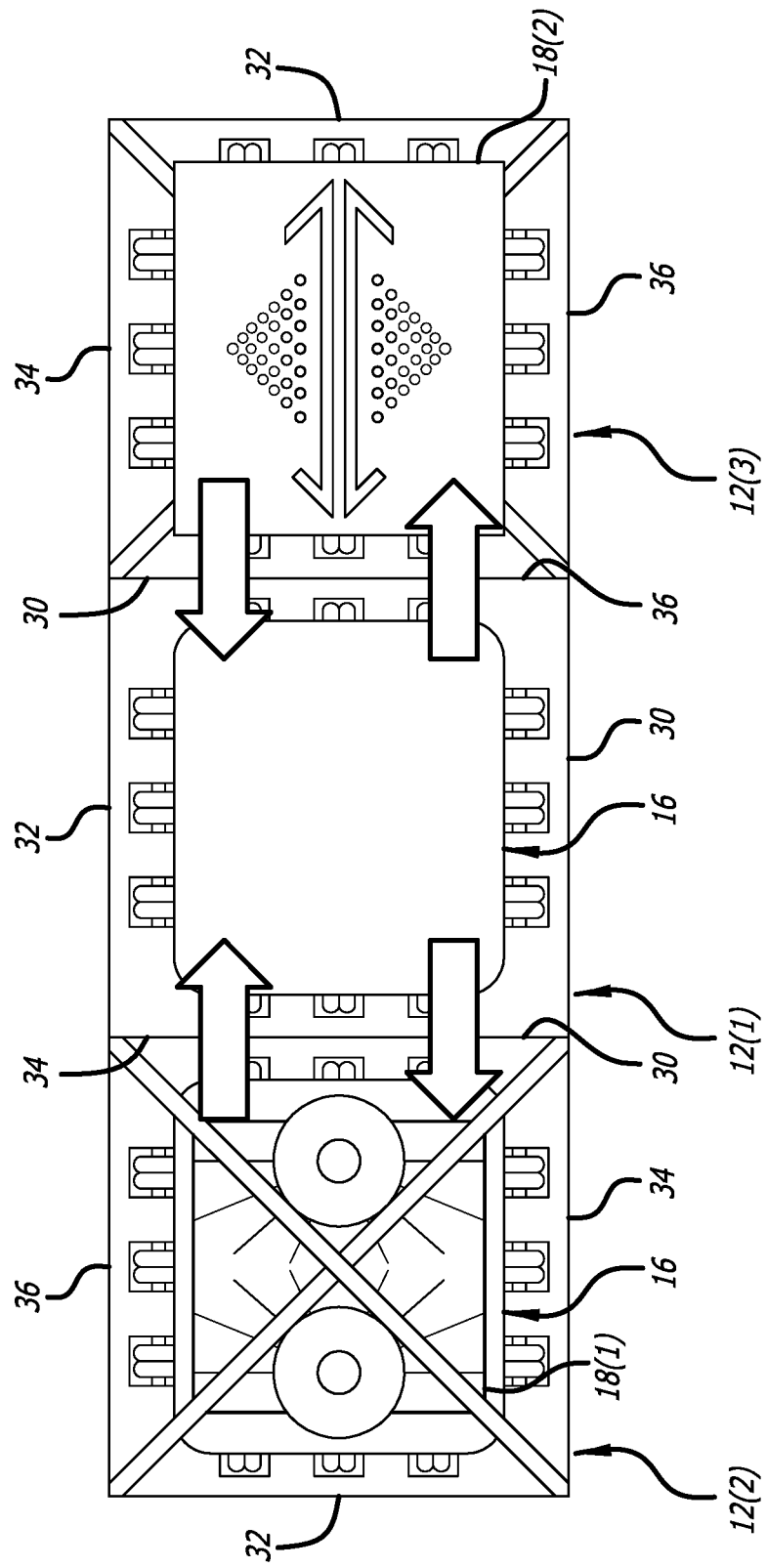
FIG. 7 is a top, plan, schematic view of another arrangement of three base modules with process flow(s) beginning at the middle of the three base modules.

Rather than, as depicted FIG. 6, having the second base module 12(2) and the third base module 12(3) perform the same operation, each of the first base module 12(1), the second base module 12(2), and the third base module 12(3) can perform different operations. As depicted in FIG. 7, the first base module 12(1) is positioned between the second base module 12(2) and the third base module 12(3). During use, the platen 16 and an article (such as, for example, a t-shirt) supported thereby can enter the first base portion 12(1) from the first side 30, and then can be sent through the third side 34 and the fourth side 36 of the first base portion 12(1) to the second base module 12(2) (via the first side 30 thereof) or the third base module 12(3) (via the first side 30 thereof), respectively. As such, the platen 16 and the t-shirt can enter the first base module 12(1) for the first operation to the t-shirt, then can be sent to a first selected one of the second base module 12(2) and the third base module 12(3) for the second operation to the t-shirt, then can be returned to the first base module 12(1), and then be sent to a different second selected one of the second base module 12(2) and the third base module 12(3) for the third operation to the t-shirt. As such, the first base module 12(1), the second base module 12(2), and the third base module 12(3) are configured for back-and-forth and perpetual movement of the platen 16.

At each of the first base module 12(1), the second base module 12(2), and the third base module 12(3), a different operation can be performed on the t-shirt provided on the platen 16. For example, the first base module 12(1) can be used for loading of the platen 16 and the t-shirt, then the platen 16 and the t-shirt can be sent to the first selected one of the second base module 12(2) and the third base module 12(3) for application of the pretreatment liquid to the t-shirt via operation of the first operational attachment 18(1) attached to the second base module 12(2) or for a misting process applied to the t-shirt via operation of the second operational attachment 18(2) attached to the third base module 12(3). Thereafter, the platen 16 and the t-shirt can be sent back to the first base module 12(1), and then sent to the second selected one of the second base module 12(2) and the third base module 12(3) for operation of the first operational attachment 18(1) or the second operational attachment 18(2). Thereafter, the platen 16 and the t-shirt can be returned to the first base module 12(1) for removal from open sides thereof, or the platen 16 and the t-shirt can be can be returned to the first selected one of the second base module 12(2) and the third base module 12(3). Thus, the process flow in FIG. 7 can be back-and-forth from the first base module 12(1) to the first selected one of the second base module 12(2) and the third base module 12(3), then across from the first selected one of the second base module 12(2) and third base module 12(3) to the second selected one of the second base module 12(2) and the third base module 12(3), and if desired, from the second selected one of the second base module 12(2) and the third base module 12(3) to the first base module 12(1) or the first selected one of the second base module 12(2) and the third base module 12(3) again. Such back-and-forth movement can be perpetual by having the operator continually loading and unloading the t-shirts on the platen 16 after of the operation or operations thereon are complete.

Figure 8:
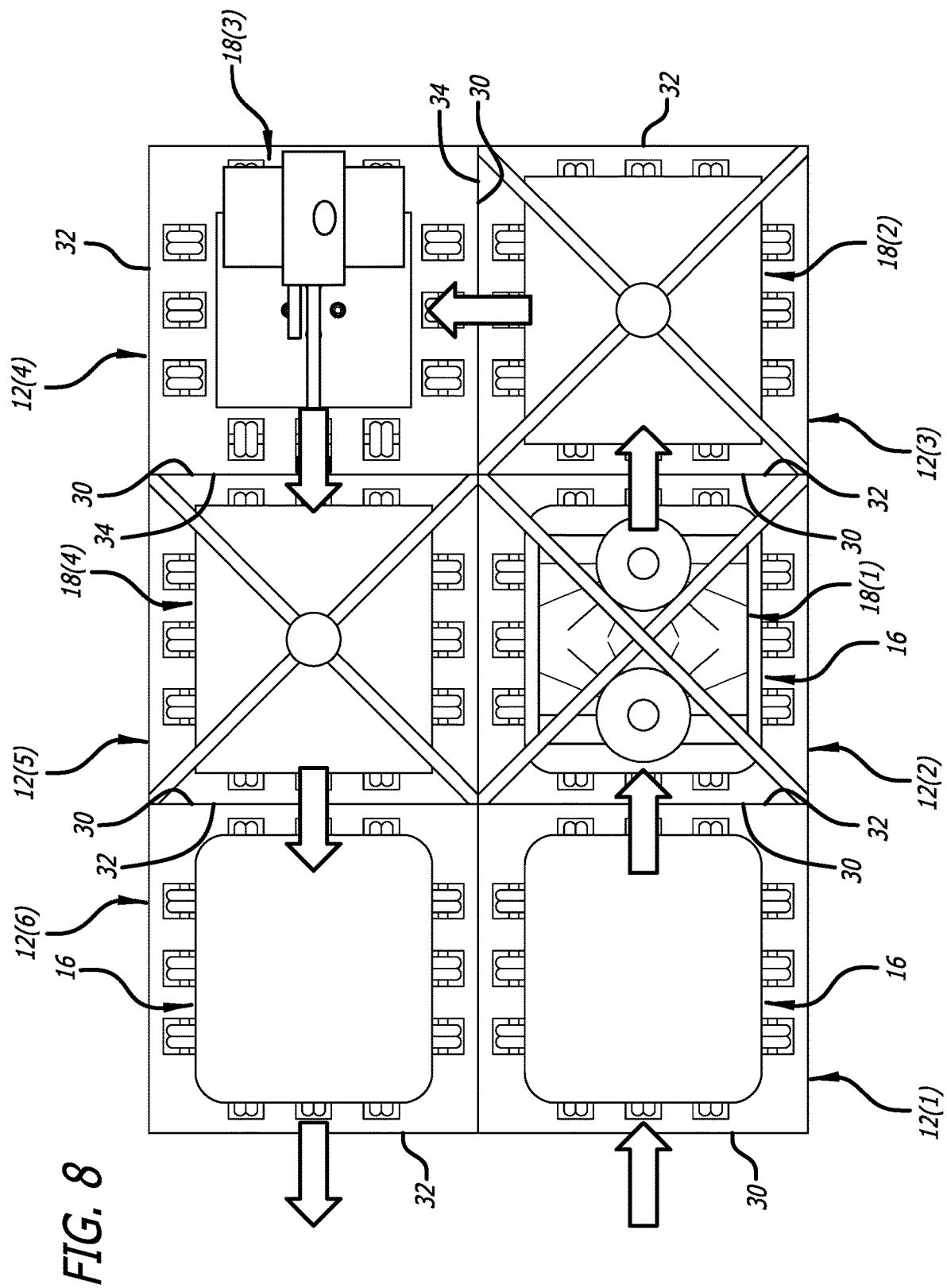
FIG. 8 is a top, plan, schematic view of an arrangement of six of the base modules with process flow(s) beginning at the left-most and lower-most of the six base modules.

As depicted in FIG. 8, an embodiment of the modular manufacturing system 10 can include six of the base modules 12 positioned with respect to another. In FIG. 8, the first base module 12(1), then the second base module 12(2), then a third base module 12(3) are arranged left to right, and a fourth base module 12(4), then a fifth base module 12(5), and then a sixth base module 12(6) are arranged right to left.

As described above, control of each of the first base module 12(1), the second base module 12(2), the third base module 12(3), the fourth base module 12(4), the fifth base module 12(5), and the sixth base module 12(6) can be centralized or decentralized. Using the centralized or decentralized control, a platen 16 and an article (such as, for example, a t-shirt) provided thereon can be sent between the first base module 12(1), the second base module 12(2), the third base module 12(3), the fourth base module 12(4), the fifth base module 12(5), and the sixth base module 12(6) to progress from the beginning to the ending of the process flow to produce a finished or semi-finished product. In particular, when decentralized, the control units of each of the first base module 12(1), the second base module 12(2), the third base module 12(3), the fourth base module 12(4), the fifth base module 12(5), and the sixth base module 12(6) can be running the independent control cycle, and using the independent control cycles, the first base module 12(1), the second base module 12(2), the third base module 12(3), the fourth base module 12(4), the fifth base module 12(5), and the sixth base module 12(6) can cooperate with one another to move the platen 16 and the t-shirt from the beginning to the ending of the process flow using the above-discussed ready to receive and ready to send determinations.

As depicted in FIG. 8, the first base module 12(1), the second base module 12(2), the third base module 12(3), the fourth base module 12(4), the fifth base module 12(5), and the sixth base module 12(6) can perform first, second, third, fourth, fifth, and sixth operations, respectively. During use, the platen 16 and the t-shirt provided thereon can enter the first base module 12(1) from the first side 30 or the fourth side 36, then the platen 16 and the t-shirt provided thereon can be sent to the second base module 12(2), then can be sent to the third base module 12(3), then can be sent to the fourth base module 12(4), then can be sent to the fifth base module 12(5), and then can be sent to the sixth base module 12(6). The platen 16 and the t-shirt provided thereon can enter the first base module 12(1) for the first operation to the t-shirt, can be sent through the second side 32 thereof to the second base module 12(2) for the second operation to the t-shirt, and so forth until the sixth operation is complete.

For example, with respect to the operations performed at these base modules 12, the first base module 12(1) can be used for loading of the platen 16 and the t-shirt, then the platen 16 and the t-shirt can be sent to the second base module 12(2) for application of the pretreatment liquid to the t-shirt via operation of the first operational attachment 18(1) (attached to the second base module 12(2)), then sent to the third base module 12(3) for drying of the pretreatment liquid on the t-shirt via operation of the second operational attachment 18(2) (attached to the third base module 12(3)), then sent to the fourth base module 12(4) for applying of the design to the t-shirt via operation of the third operational attachment 18(3) (attached to the fourth base module 12(4)), then sent to the fifth base module 12(5) for drying of the design on the t-shirt via operation of the fourth operation attached 18(4) (attached to the fifth base module 12(5)), and then sent to the sixth base module 12(6) for unloading of the platen 16 and the t-shirt from open sides thereof. Thus, the process flow in FIG. 8 can be serial from the first base module 12(1) to the second base module 12(2) to the third base module 12(3) to the fourth base module 12(4) to the fifth base module 12(5) to the sixth base module 12(6).

Such serial movement can be recurrent by unloading the platen 16 and the t-shirt from the sixth base module 12(6), and repeating the process flow by continually loading successive platens 16 and new t-shirts provided thereon into the first base module 12(1) and sending the successive platens 16 and the new t-shirts through the process flow to the sixth base module 12(6) for unloading. And such serial movement can be perpetual by unloading the t-shirt from the platen 16 at the sixth base module 12(6), sending the platen 16 from the sixth base module 12(6) to the first base module 12(1), and reloading the platen 16 with a new t-shirt. Whether the process flow is serial and recurrent or serial and perpetual, a multitude of platens 16 and t-shirts provided thereon can be progressing through the process flow at the same time. Moreover, given that the first base module 12(1) and the sixth base module 12(6) are adjacent one another, the operator can alternate between unloading the platens 16 and/or the t-shirts provided thereon from the sixth base module 12, and loading the successive platens 16 and/or new t-shirts on the first base module 12(1).

Figure 9:
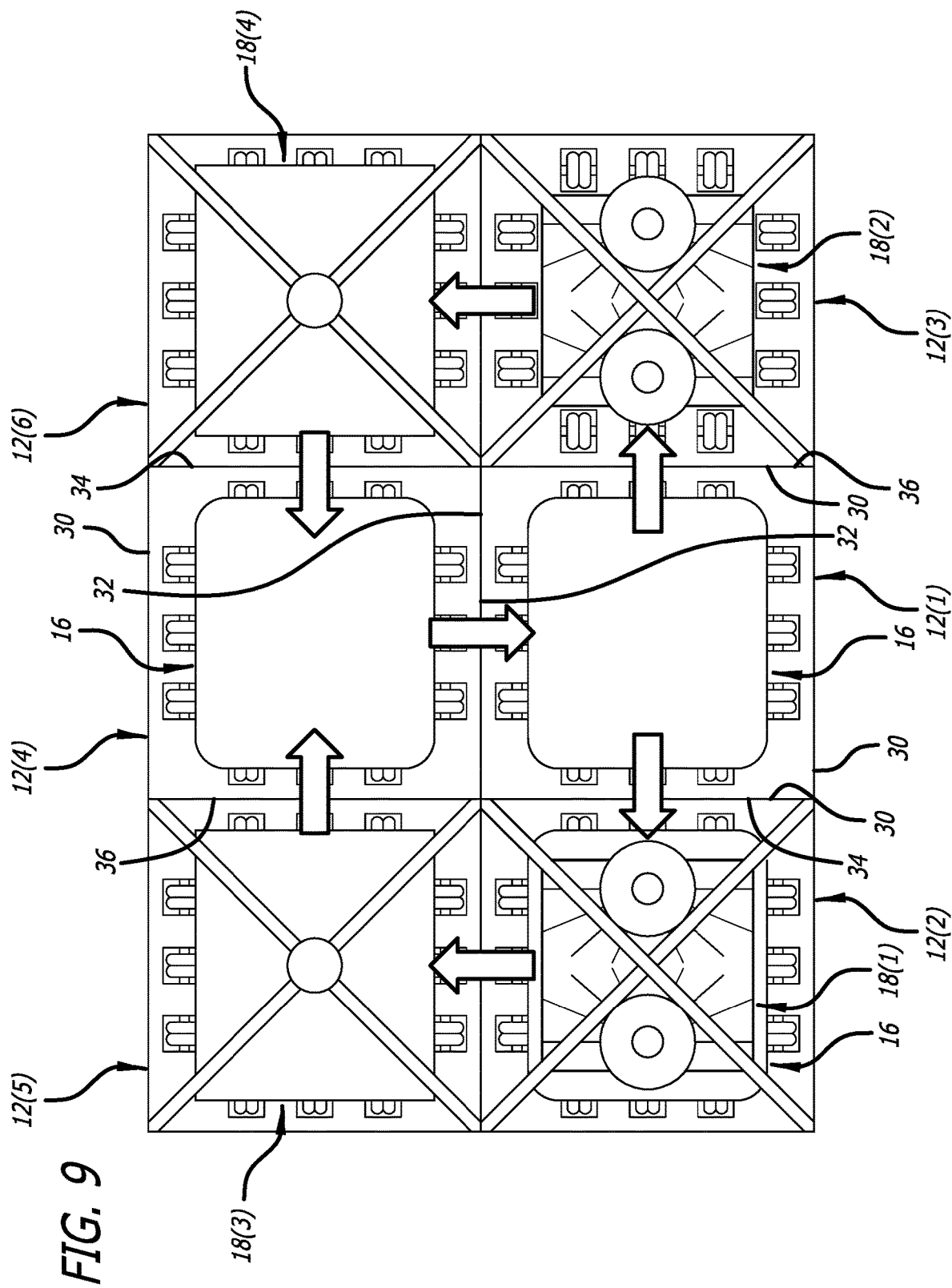
FIG. 9 is a top, plan, schematic view of an arrangement of six of the base modules with process flow(s) beginning at the middle and lower-most of the six base modules.

As depicted in FIG. 9, the modular manufacturing system 10 also includes six of the base modules 12 arranged with respect to one another, but the arrangement of the base modules 12 is different than in FIG. 8. To illustrate, the first base module 12(1) is positioned between the second base module 12(2) and the third base module 12(3) with the second base module 12(2) adjacent the third side 34 of the first base module 12(1) and the third base module 12(3) adjacent the fourth side 36 of the first base module 12(1). Furthermore, the fourth base module 12(4) is positioned between the fifth base module 12(5) and the sixth base module 12(6) with the fifth base module 12(5) adjacent the fourth side 36 of the fourth base module 12(4) and the sixth base module 12(6) adjacent the third side 34 of the fourth base module. Furthermore, the fourth base module 12(1) is positioned adjacent the first base module 12(1), the fifth base module 12(5) is positioned adjacent the second base module 12(2), and the sixth base module 12(6) is positioned adjacent the third base module 12(3).

As described above, control of each of the first base module 12(1), the second base module 12(2), the third base module 12(3), the fourth base module 12(4), the fifth base module 12(5), and the sixth base module 12(6) can be centralized or decentralized. Using the centralized or decentralized control, a platen 16 and an article (such as, for example, a t-shirt) provided thereon can be moved through the base modules 12 to progress from the beginning to the ending of the process flow to produce a finished or semi-finished product. In particular, when decentralized, the control units of each of the first base module 12(1), the second base module 12(2), the third base module 12(3), the fourth base module 12(4), the fifth base module 12(5), and the sixth base module 12(6) can be running the independent control cycle, and using the independent control cycles, the first base module 12(1), the second base module 12(2), the third base module 12(3), the fourth base module 12(4), the fifth base module 12(5), and the sixth base module 12(6) can cooperate with one another to move the platen 16 and the t-shirt from the beginning to the ending of the process flow using the above-discussed ready to receive and ready to send determinations.

As depicted in FIG. 9, the first base module 12(1) can perform a first operation, the second base module 12(2) and the third base module 12(3) each can perform a second operation, the fifth base module 12(5) and the sixth base module 12(6) each can perform a third operation, and the fourth base module 12(4) can perform a fourth operation. During use, the platen 16 and the t-shirt provided thereon can enter the first base portion 12(1) from the first side 30, and then can be sent through the third side 34 thereof to the second base module 12(2) or though the fourth side 36 thereof to the third base module 12(3). As such, the platen 16 and the t-shirt can enter the first base module 12(1) for the first operation to the t-shirt, then can be sent to one of the second base module 12(2) or the third base module 12(3) for the second operation to the t-shirt. Then the platen 16 can be sent to the fifth base module 12(5) from the second base module 12(2), or can be sent to the sixth base module 12(6) from the third base module 12(3) for the third operation to the t-shirt. Thereafter, the platen 16 and the t-shirt can be sent from the fifth base module 12(5) or the sixth base module 12(6) to the fourth base module 12(4) for the fourth operation to the t-shirt, and then returned from the fourth base module 12(4) to the first base module 12(1).

For example, with respect to the operations performed at these base modules 12, the first base module 12(1) can be used for loading/unloading of the platen 16 and the t-shirt, then the platen 16 and the t-shirt can be sent to the second base module 12(2) or the third base module 12(3) for application of the pretreatment liquid to the t-shirt via operation of the first operational attachment 18(1) (attached to the second base module 12(2)) or the second operational attachment 18(2) (attached to the third base module 12(3)). After application of the pretreatment liquid to the t-shirt at the second base module 12(2) or the third base module 12(3), the platen 16 and the t-shirt can be sent to the fifth base module 12(5) and the sixth base module 12(6), respectively. At the fifth base module 12(5) and the sixth base module 12(6), operation of the third operational attachment 18(3) and a fourth operational attachment 18(4), respectively, perform the drying process for drying the pretreatment on the t-shirt. After drying of the pretreatment on the t-shirt, the platen 16 and the t-shirt can be sent to the fourth base module 12(4). Thereafter, the fourth base module 12(4) can serve as a waiting station, and can return the platen 16 and the t-shirt back to the first base module 12(1) for unloading when the first base module 12(1) is open.

Thus, in FIG. 9, a first process flow can be serial from the first base module 12(1) to the second base module 12(2) to the fifth base module 12(5) to the fourth base module 12(4), and then back to the first base module 12(1), and a second process flow can be serial from the first base module 12(1) to the third base module 12(3) to the sixth base module 12(6) to the fourth base module 12(4), and then back to the first base module 12(1). Given the two serial process flows, a first platen 16 and a first t-shirt provided thereon can follow the first serial process flow, and then a second platen 16 and a second t-shirt provided thereon can follow second serial process flow in a staggered fashion with the first serial process flow (for the first platen 16 and the first t-shirt) starting and finishing first, and the second serial process flow (for the second platen 16 and the second t-shirt) starting and finishing second.

Such serial movement can be recurrent by unloading the first platen 16 and the first t-shirt provided thereon at the first base module 12(1), and repeating the first process flow by continually loading successive platens 16 and new t-shirts provided thereon on the first base module 12(1) and into the first process flow; and unloading the second platen 16 and the second t-shirt provided thereon at the first base module 12(1), and repeating second process flow by continually loading successive platens 16 and new t-shirts provided thereon on the first base module 12(1) and into the second process flow. As such, the operator can load a successive platen 16 and a new t-shirt into the first process flow right after the operator unloads the first platen 16 and the first t-shirt provided thereon from the first base module 12(1). Thereafter, the operator can load a successive platen 16 and a new t-shirt into the second process flow after the operator unloads the second platen 16 and the second t-shirt from the first base module 12(1).

Such serial movement can be perpetual by unloading the first t-shirt from the first platen 16 at the first base module 12(1), reloading the first platen 16 with a new t-shirt, and repeating the first platen 16 with the new t-shirt through the first process flow, and by unloading the second t-shirt from the second platen 16 at the first base module 12(2), reloading the second platen 16 with a new t-shirt, and repeating the second platen 16 with the new t-shirt through the second process flow. As there are six base modules in the embodiment of FIG. 9, and at least one of the six base modules 12 would be empty to afford using of the first and second process flows, up to an additional three platens 16 (for a total of five platens 16) can be circulated through the first and second process flows. As such, after the t-shirts are unloaded from each of the five platens 16 at the first base module 12(1), the operator continually can load new t-shirts on each of the five platens 16, and each of the five platens 16 and the new t-shirts provided thereon can be directed into the first process flow or the second process flow in a staggered fashion.

Whether the serial process flows in FIG. 9 are recurrent or perpetual, a multitude of platens 16 and t-shirts can be progressing through the first and second process flows at the same time. Furthermore, the use of these identical process flows creates redundancy in the system, because if one of the first and second process flows is out of order, the other process flow can still continue operation. Additionally, rather than having the first serial process flow and the second serial process flow having the same operations applied to the t-shirts moved therethrough, the different process flows can incorporate different operations. For example, rather than having the second operational attachment 18(2) at the third base module 12(3) perform application of the pretreatment liquid to the t-shirt, the second operational attachment 18(2) can perform the application process for applying of the design to the t-shirt. Thereafter, the fourth operational attachment 18(4) at the sixth base module 12(4) can be used to perform the drying process on the design applied to the t-shirt by the second operational attachment 18(2). Thus, a platen 16 and a t-shirt provided thereon could follow the first process flow for application and drying of the pretreatment, and then follow the second process flow for application and drying of the design. And in similar fashion to that described above, the first and second process incorporating different operations can be serial and recurrent or serial and perpetual.

Figure 10:
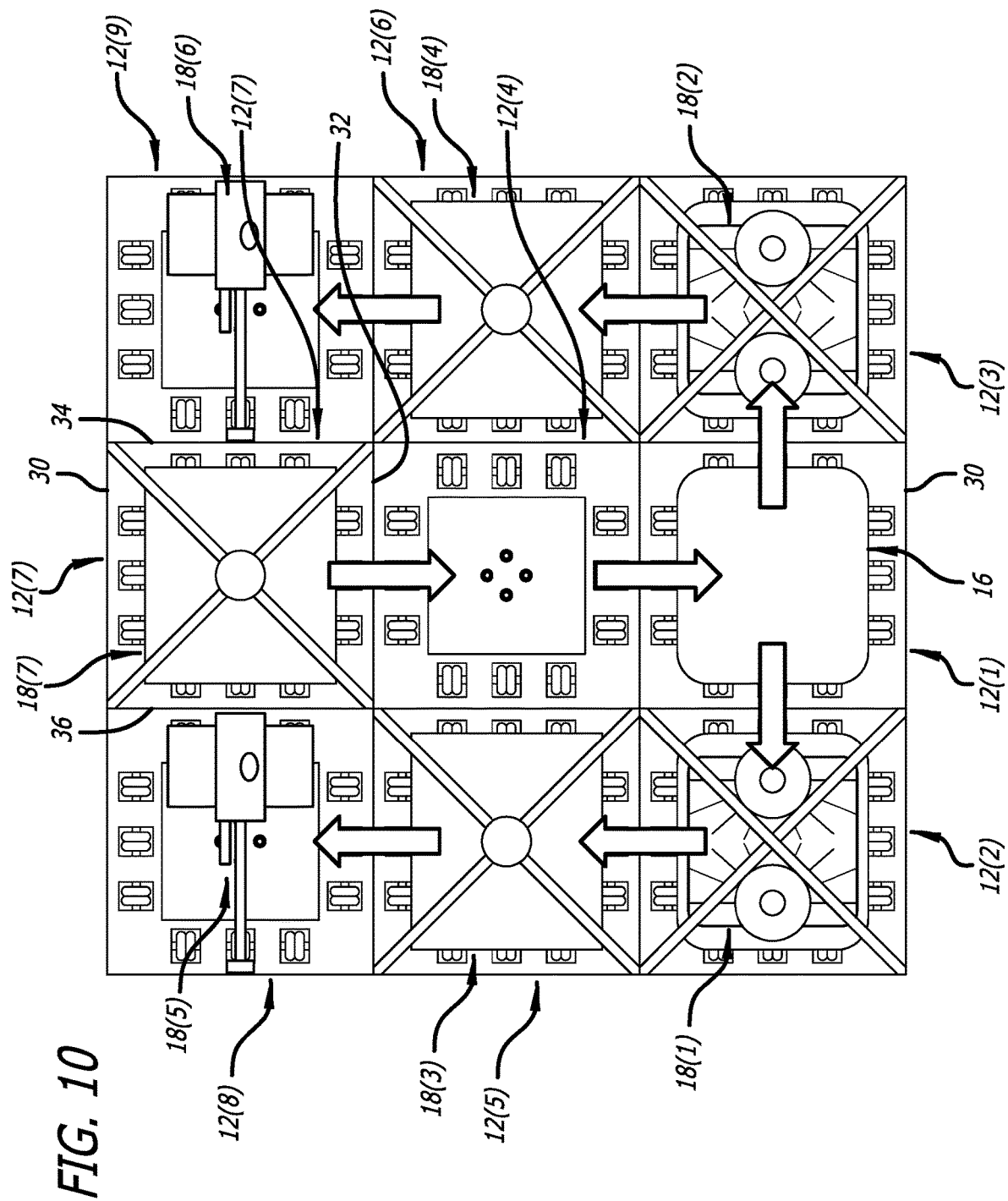
FIG. 10 is a top, plan, schematic view of an arrangement of nine of the base modules with process flow(s) beginning at the middle and lower-most of the nine base modules.

As depicted in FIG. 10, the modular manufacturing system 10 includes nine of the base modules 12 arranged with respect to one another. To illustrate, in similar fashion to FIG. 9, the first base module 12(1) is positioned between the second base module 12(2) and the third base module 12(3), and the fourth base module 12(4) is positioned between the fifth base module 12(5) and the sixth base module 12(6). Furthermore, a seventh base module 12(7) is positioned between an eighth base module 12(8) and a ninth base module 12(9) with the eighth base module 12(8) adjacent the fourth side 36 of the seventh base module 12(7) and the ninth base module 12(9) adjacent the third side 34 of the seventh base module 12(7).

As described above, control of each of the first base module 12(1), the second base module 12(2), the third base module 12(3), the fourth base module 12(4), the fifth base module 12(5), the sixth base module 12(6), the seventh base module 12(7), the eighth base module 12(8), and the ninth base module 12(9) can be centralized or decentralized. Using the centralized or decentralized control, a platen 16 and an article (such as, for example, a t-shirt) provided thereon can be sent through the base modules 12 to progress from the beginning to the ending of the process flow to produce a finished or semi-finished product. In particular, when decentralized, the control units of each of the first base module 12(1), the second base module 12(2), the third base module 12(3), the fourth base module 12(4), the fifth base module 12(5), the sixth base module 12(6), the seventh base module 12(7), the eighth base module 12(8), and the ninth base module 12(9) can be running the independent control cycle, and using the independent control cycles, the first base module 12(1), the second base module 12(2), the third base module 12(3), the fourth base module 12(4), the fifth base module 12(5), the sixth base module 12(6), the seventh base module 12(7), the eighth base module 12(8), and the ninth base module 12(9) can cooperate with one another to move the platen 16 and the t-shirt from the beginning to the ending of the process flow using the above-discussed ready to receive and ready to send determinations.

As depicted in FIG. 10, first base module 12(1) can perform a first operation, the second base module 12(2) and the third base module 12(3) each can perform a second operation, the fifth base module 12(5) and the sixth base module 12(6) each can perform a third operation, the eighth base module 12(8) and the ninth base module 12(9) each perform a fourth operation, the seventh base module 12(7) can perform a fifth operation, and the fourth base module 12(4) can perform a sixth operation. During use, the platen 16 and the t-shirt supported thereby can enter the first base portion 12(1) from the first side 30, and then can be sent through the third side 34 thereof to the second base module 12(2) or though the fourth side 36 thereof to the third base module 12(3). As such, the platen 16 and the t-shirt can enter the first base module 12(1) for the first operation to the t-shirt, then can be sent to one of the second base module 12(2) or the third base module 12(3) for the second operation to the t-shirt. Thereafter, the platen 16 and the t-shirt can be sent to the fifth base module 12(5) from the second base module 12(2), or can be sent to the sixth base module 12(6) from the third base module 12(3) for the third operation to the t-shirt. Then, the platen 16 and the t-shirt can be sent to the eighth base module 12(8) from the fifth base module 12(5), or can be sent to the ninth base module 12(9) from the sixth base module 12(6) for the fourth operation to the t-shirt. Thereafter, the platen 16 can be sent from the eight base module 12(8) or the ninth base module 12(9) to the seventh base module 12(7) for the fifth operation to the t-shirt, then sent from the seventh base module 12(7) to the fourth base module 12(4) for the sixth operation to the t-shirt, and then returned from the fourth base module 12(4) to the first base module 12(1).

For example, with respect to the operations performed at these base modules 12, the first base module 12(1) can be used for loading/unloading of the platen 16 and the t-shirt, then the platen 16 and the t-shirt can be sent to the second base module 12(2) or the third base module 12(3) for application of the pretreatment liquid to the t-shirt via operation of the first operational attachment 18(1) (attached to the second base module 12(2)) or the second operational attachment 18(1) (attached to the third base module 12(3)). After application of the pretreatment liquid to the t-shirt at the second base module 12(2) or the third base module 12(3), the platen 16 and the t-shirt can be sent to the fifth base module 12(5) and the sixth base module 12(6), respectively. At the fifth base module 12(5) and the sixth base module 12(6), operation of the third operational attachment 18(3) and a fourth operational attachment 18(4), respectively, can perform the drying process for drying the pretreatment on the t-shirt. After the pretreatment is dried on the t-shirt at the fifth base module 12(5) or the sixth base module 12(6), the platen 16 and the t-shirt can be sent to the eighth base module 12(8) and the ninth base module 12(9), respectively. At the eighth base module 12(8) and the ninth base module 12(9), operation of a fifth operation attachment 18(5) and a sixth operational attachment 18(6), respectively, can perform the application process for applying of the design to the t-shirt. Thereafter, the platen 16 and t-shirt can be sent to the seventh base module 12(7). At the seventh base module 12(7), operation of a seventh operational attachment 18(7) can perform the drying process for drying the design on the t-shirt. After drying of the design on the t-shirt, the platen 16 and the t-shirt can be move to the fourth base module 12(4). Then, the fourth base module 12(4) can serve as the waiting station, and can return the platen 16 and the t-shirt back to the first base module 12(1) for unloading when the first base module 12(1) is open.

Thus, in FIG. 10, a first process flow can be serial from the first base module 12(1) to the second base module 12(2) to the fifth base module 12(5) to the eighth base module 12(8) to the seventh base module 12(7) to the fourth base module 12(4), and then back to the first base module 12(1), and a second process flow can be serial from the first base module 12(1) to the third base module 12(3) to the sixth base module 12(6) to the ninth base module 12(9) to the seventh base module 12(7) to the fourth base module 12(4), and then back to the first base module 12(1). Given the two serial process flows, a first platen 16 and a first t-shirt provided thereon can follow the first serial process flow, and then a second platen 16 and a second t-shirt provided thereon can follow second serial process flow in a staggered fashion with the first serial process flow (for the first platen 16 and the first t-shirt) starting and finishing first, and the second serial process flow (for the second platen 16 and the second t-shirt) starting and finishing second.

Such serial movement can be recurrent by unloading the first platen 16 and the first t-shirt provided thereon at the first base module 12(1), and repeating the first process flow by having the operator continually loading successive platens 16 and new t-shirts on the first base module 12(1) and into the first process flow, and unloading the second platen 16 and the second t-shirt provided thereon at the first base module 12(1), and repeating the second process flow by continually having the operator loading successive platens 16 and new t-shirts one the first base module 12(1) and into the second process flow.

And such serial movement can be perpetual by unloading the first t-shirt from the first platen 16 at first base module 12(1), reloading the first platen 16 with a new t-shirt, and repeating the first platen 16 with the new t-shirt through the first process flow, and by unloading the second t-shirt from the second platen 16 at the first base module 12(1), reloading the second platen 16 with a new t-shirt, and the repeating the second platen 16 with the new t-shirt through the second process flow. As there are nine base modules in the embodiment of FIG. 10, and at least one of the nine base modules 12 would be empty to afford using of the first and second process flows, up to an additional six platens 16 (for a total of eight platens 16) can be circulated through the first and second process flows. As such, after the t-shirts are unloaded from each of the eight platens 16 at the first base module 12(1), new t-shirts continually can be loaded by the operator on each of the eight platens 16 for direction into the first process flow and the second process flow in staggered fashion.

Whether the serial process flows in FIG. 10 are recurrent or perpetual, a multitude of platens 16 and t-shirts can be progressing through the first and second process flows at the same time Furthermore, the use of these identical process flows creates redundancy in the system, because if one of the first and second process flows is out of order, the other process flow can still continue operation. Additionally, rather than having the first serial process flow and the second serial process flow having the same operations applied to the t-shirts moved therethrough, the different process flows can incorporate different operations, and a platen 16 and a t-shirt provided thereon could follow the first process flow, and then follow the second process flow. And in similar fashion to that described above, the first and second process incorporating different operations can be serial and recurrent or serial and perpetual.

It should be understood that various aspects disclosed herein may be combined in different combinations than the combinations specifically presented in the description and the accompanying drawings. It should also be understood that, depending on the example, certain acts or events of any of the processes of methods described herein may be performed in a different sequence, may be added, merged, or left out altogether (e.g., all described acts or events may not be necessary to carry out the techniques). In addition, while certain aspect of this disclosure are described as being performed by a single module or unit for purposes of clarity, it should be understood that the techniques of this disclosure may be performed by a combination of units or modules associated with the modular manufacturing system 10.

I claim:

1. A method of using a modular manufacturing system, the method comprising:

providing at least three interchangeable base modules each having a first side, a second side opposite from the first side, a third side to the left of the first side, a fourth side to the right of the first side, a directional movement portion, and at least one operational attachment attached relative to at least two of the at least three base modules, the directional movement portion defining a working area for performing at least one operation on one or more articles passing through the working area, the directional movement portion being configured to move one or more platens supporting the one or more articles and loaded onto the directional movement portion from one of the first side, the second side, the third side, and the fourth side through the working area and out of another of the first side, second side, the third side, and the fourth side;

positioning a first base module of the at least three interchangeable base modules in a first position, positioning a second base module of the at least three interchangeable base modules in a second position adjacent the first base module, and positioning a third base module of the at least three interchangeable base modules in a third position adjacent the second base module;

defining sides of the first base module, the second base module, and the third base module, so that the first side of the second base module is adjacent the second side of the first base module, and the first side of the third base module is adjacent the second side of the second base module;

defining a first process flow arrangement by:

receiving a first platen of the one or more platens supporting a first article of the one or more articles through the first side and into the working area of the first base module, moving, using the directional movement portion of the first base module, the first platen and the first article through the working area of the first base module and out of the second side of the first base module into the second base module, receiving the first platen and the first article through the first side and into the working area of the second base module and performing a first operation by a first operational attachment attached relative to the second base module, moving, using the directional movement portion of the second base module, the first platen and the first article through the working area of the second base module and out of the second side of the second base module into the third base module, receiving the first platen and the first article through the first side and into the working area of the third base module and performing a second operation by a second operational attachment attached relative to the third base module, and moving, using the directional movement portion of the third base module, the first platen and the first article through the working area of the third base module and out of one of the second side, the third side, and the fourth side of the third base module;

redefining the sides of the first base module, the second base module, and the third base module, so that the first side of the first base module is adjacent the third side of the second base module, and the first side of the third base module is adjacent the fourth side of the second base module, and attaching the first operational attachment relative to the first base module; and defining a second process flow arrangement by:

receiving a second platen of the one or more platens supporting a second article of the one or more articles through the first side of the second base module, moving, using the directional movement portion of the second base module, the second platen and the second article through the working area of the second base module and out of the third side of the second base module into the first base module, receiving the second platen and the second article through the first side and into the working area of the first base module and performing the first operation by the first operational attachment attached relative to the first base module, one of removing the second platen and the second article through one of the second side, the third side, and the fourth side of the first base module, and moving, using the directional movement portion of the first base module, the second platen and the second article through the working area and out of the first side of the first base module and into the second base module, receiving the second platen and the second article through the third side and into the working area of the second base module, and moving, using the directional movement portion of the second base module, the second platen and the second article through the working area of the second base module and out of the fourth side of the second base module into the third base module, receiving the second platen and the second article through the first side and into the working area of the third base module and performing the second operation by the second operational attachment attached relative to the third base module, and one of removing the second platen and the second article through one of the second side, the third side, and the fourth side of the third base module, and moving, using the directional movement portion of the third base module, the second platen and the second article through the working area and out of the first side of the third base module and into the second base module for removal therefrom.

2. The method of claim 1, wherein the first article and the second article are each garments, and the first operational attachment is a pretreatment application attachment for applying a pretreatment liquid to areas of the garments during performance of the first operation.

3. The method of claim 2, wherein the second operational attachment is one of a forced-air dryer and a heat press for drying the pretreatment liquid on the garments during performance of the second operation.

4. The method of claim 2, further comprising drying the pretreatment onto the garments, and wherein the second operational attachment is an applicator for applying a design to the areas of the garments applied with the pretreatment liquid during performance of the second operation.

5. The method of claim 4, wherein the applicator can be one of a direct-to-garment printer, a screen-printer, and a heat-press printer.

6. The method of claim 1, further comprising
reattaching the first operational attachment relative to the second base module;
positioning a fourth base module of the at least three interchangeable base modules in a fourth position adjacent the third base module;
redefining sides of the first base module, the second base module, and the third base module, so that the first side of the second base module is adjacent the second side of the first base module, the first side of the third base module is adjacent the second side of the second base module, and the first side of the fourth base module is adjacent the second side of the third base module; and
defining a third process flow arrangement by:
receiving a third platen of the one or more platens supporting a third article of the one or more articles through the first side and into the working area of the first base module,
moving, using the directional movement portion of the first base module, the third platen and the third article through the working area of the first base module and out of the second side of the first base module into the second base module,
receiving the third platen and the third article through the first side and into the working area of the second base module and performing the first operation by the first operational attachment attached relative to the second base module,
moving, using the directional movement portion of the second base module, the third platen and the third article through the working area of the second base module and out of the second side of the second base module into the third base module,
receiving the third platen and the third article through the first side and into the working area of the third base module and performing the second operation by the second operational attachment attached relative to the third base module,
moving, using the directional movement portion of the third base module, the third platen and the third article through the working area of the third base module and out of the second side of the third base module into the fourth base module,
receiving the third platen and the third article through the first side and into the working area of the fourth base module and performing a third operation by a third operational attachment attached relative to the fourth base module, and
moving, using the directional movement portion of the fourth base module, the third platen and the third article through the working area of the fourth base module and out of one of the second side, the third side, and the fourth side of the fourth base module.

7. The method of claim 6, wherein the first article, the second article, and the third article are each garments, the first operational attachment is a pretreatment application attachment for applying a pretreatment liquid to areas of the garments during performance of the first operation.

8. The method of claim 7, wherein the second operational attachment is one of a forced-air dryer and a heat press for drying the pretreatment liquid on the garments during performance of the second operation.

9. The method of claim 8, wherein the third operational attachment is an applicator for applying a design to the areas of the garments applied with the pretreatment liquid during performance of the third operation.

10. The method of claim 1,
repositioning the first base module between the second base module and third base module and redefining the sides of the first base module, the second base module, and the third base module, so that the first side of the second base module is adjacent to the side of the first base module, and the first side of the third base module is adjacent the fourth side of the first base module;
positioning a fourth base module of the at least three interchangeable base modules in a fourth position adjacent the first base module with the second side of the fourth base module positioned adjacent the second side of the first base module,
positioning a fifth base module of the at least three interchangeable base modules in a fifth position adjacent the second base module and the fourth base module with the first side of the fifth base module positioned adjacent the fourth side of the second base module, and the fourth side of the fifth base module positioned adjacent the fourth side of the fourth base module;
positioning a sixth base module of the at least three interchangeable base modules in a sixth position adjacent the third base module and the fourth base module with the first side of the sixth base module positioned adjacent the third side of the third base module, and the third side of the sixth base module positioned adjacent the third side of the fourth base module,
receiving a third platen of the one or more platens supporting a third article of the one or more articles through the first side and into the working area of the first base module,
moving, using the directional movement portion of the first base module, the third platen and the third article through the working area of the of the first module and out of one of the third side and the fourth side of the first base module into the second base module and the third base module, respectively,
if the third platen and the third article is received on the second base module, performing the first operation by the first operational attachment attached relative to the second base module, moving, using the directional movement portion of the second base module, the third platen and the third article through the working area of the second base module and out of the fourth side of the second base module into the fifth base module, performing a third operation by a third operational attachment attached relative to the fifth base module, and one of moving, using the directional movement portion of the fifth base module, the third platen and the third article through the working area of the fifth base module and out of the fourth side of the fifth base module into the fourth base module, and removing the third platen and the third article from the fifth base module,
if the third platen and the third article is received on the third base module, performing the second operation by the second operational attachment attached relative to the third base module, moving, using the directional movement portion of the third base module, the third platen and the third article through the working area of the third base module and out of the third side of the third base module into the sixth base module, performing a fourth operation by a fourth operational attachment attached relative to the sixth base module, and one of moving, using the directional movement portion of the sixth base module, the third platen and the third article through the working area of the sixth base module and out of the third side of the sixth base module into the fourth base module, and removing the third platen and the third article from the sixth base module, if the third platen and the third article is received by the fourth base module, one of moving, using the directional movement portion of the fourth base module, the third platen and the third article from the fourth base module to the first base module, and removing the third platen and the third article from the fourth base module, and if the third platen and the third article is sent back to the first base module, removing the third platen and the third article from the first base module.

11. The method of claim 10, further comprising sending a fourth platen and a fourth article immediately following the third platen and the third article through one of a third process flow arrangement through the first base module, the second base module, and the fifth base module, and a fourth process flow arrangement through the first base module, the third base module, and the sixth base module.

12. The method of the 11, further comprising sending a fifth platen and a fifth article through the other of the third process flow arrangement and the fourth process flow arrangement.

13. The method of claim 10, wherein the third article are is a garment, the first operational attachment and the second operational attachment are each a pretreatment application attachment for applying a pretreatment liquid to an area of the garment during performance of the first operation and the second operation.

14. The method of claim 13, wherein the third operational attachment and the fourth operational attachment are each one of a forced-air dryer and a heat press for drying the pretreatment liquid on the garment during performance of the third operation and the fourth operation.

15. The method of claim 14, wherein a fifth operational attachment is attached to the fourth base module, and further comprising applying a design to the area of the garment applied with the pretreatment liquid during performance of a fifth operation by the fifth operational attachment.

16. The method of claim 15, wherein the fifth operational attachment is one of a direct-to-garment printer, a screen-printer, and a heat-press printer.

17. The method of claim 10, wherein the third article is a garment, the first operational attachment is a pretreatment applicator for applying a pretreatment liquid to an area of the garment during performance of the first operation, and the third operational attachment is one of a forced-air dryer and a heat press for drying the pretreatment on the garment during performance of the third operation.

18. The method of claim 17, wherein the second operational attachment is an applicator for applying a design to the area of the garment applied with the pretreatment liquid during performance of the second operation, and the fourth operational attachment is one of a forced air-dryer and a heat press for drying the design on the garment during performance of the fourth operation.

19. The method of claim 18, where the third platen and the third article is sent is sent through a third process flow arrangement from the first base module through the second base module, the fifth base module, and the fourth base module, and then back to first base module from operations performed at the second base module and the fifth base module, and then the third platen and the third article is sent is sent through a fourth process flow arrangement from the first base module through the third base module, the sixth base module, and the fourth base module, and then back to the first base module from operations performed at the third base module and the sixth base module.

20. A method of using a modular manufacturing system, the method comprising:

providing at least three interchangeable base modules each having a first side, a second side opposite from the first side, a third side to the left of the first side, a fourth side to the right of the first side, a directional movement portion, and at least one operational attachment attached relative to at least two of the at least three base modules, the directional movement portion defining a working area for performing at least one operation on one or more articles passing through the working area, the directional movement portion being configured to move one or more platens supporting the one or more articles and loaded onto the directional movement portion from one of the first side, the second side, the third side, and the fourth side through the working area and out of another of the first side, second side, the third side, and the fourth side;

positioning a first base module of the at least three interchangeable base modules in a first position, positioning a second base module of the at least three interchangeable base modules in a second position adjacent the first base module, and positioning a third base module of the at least three interchangeable base modules in a third position adjacent the second base module;

defining sides of the first base module, the second base module, and the third base module, so that the first side of the second base module is adjacent the second side of the first base module, and the first side of the third base module is adjacent the second side of the second base module;

defining a first process flow arrangement by:
receiving a first platen of the one or more platens supporting a first article of the one or more articles through the first side and into the working area of the first base module, moving, using the directional movement portion of the first base module, the first platen and the first article through the working area of the first base module and out of the second side of the first base module into the second base module, receiving the first platen and the first article through the first side and into the working area of the second base module and performing a first operation by a first operational attachment attached relative to the second base module, moving, using the directional movement portion of the second base module, the first platen and the first article through the working area of the second base module and out of the second side of the second base module into the third base module, receiving the first platen and the first article through the first side and into the working area of the third base module and performing a second operation by a second operational attachment attached relative to the third base module, and moving, using the directional movement portion of the third base module, the first platen and the first article through the working area of the third base module and out of one of the second side, the third side, and the fourth side of the third base module;

repositioning the first base module between the second base module and the third base module, and redefining the sides of the first base module, the second base module, and the third base module, so that the first side of the second base module is adjacent the third side of the first base module, and the first side of the third base module is adjacent the fourth side of the first base module; and defining a second process flow arrangement by:
receiving a second platen of the one or more platens supporting a second article of the one or more articles through the first side of the first base module,
moving, using the directional movement portion of the first base module, the second platen and the second article through the working area of the first base module and out of the third side of the first base module into the second base module,
receiving the second platen and the second article through the first side and into the working area of the second base module and performing the first operation by the first operational attachment attached relative to the second base module,
one of removing the second platen and the second article through one of the second side, the third side, and the fourth side of the second base module, and moving, using the directional movement portion of the second base module, the second platen and the second article through the working area and out of the first side of the second base module and into the first base module,
receiving the second platen and the second article through the third side and into the working area of the first base module, and moving, using the directional movement portion of the first base module, the second platen and the second article through the working area of the first base module and out of the fourth side of the first base module into the third base module,
receiving the second platen and the second article through the first side and into the working area of the third base module and performing the second operation by the second operational attachment attached relative to the third base module, and
one of removing the second platen and the second article through one of the second side, the third side, and the fourth side of the third base module, and moving, using the directional movement portion of the third base module, the second platen and the second article through the working area and out of the first side of the third base module and into the first base module for removal therefrom.

21. The method of claim 20, wherein the first article and the second article are each garments, and the first operational attachment is a pretreatment application attachment for applying a pretreatment liquid to areas of the garments during performance of the first operation.

22. The method of claim 21, wherein the second operational attachment is one of a forced-air dryer and a heat press for drying the pretreatment liquid on the garments during performance of the second operation.

23. The method of claim 22, further comprising drying the pretreatment onto the garments, and wherein the second operational attachment is an applicator for applying a design to the areas of the garments applied with the pretreatment liquid during performance of the second operation.

24. The method of claim 23, wherein the applicator can be one of a direct-to-garment printer, a screen-printer, and a heat-press printer.

* * * * *